United States Patent
Park et al.

(10) Patent No.: US 11,153,277 B2
(45) Date of Patent: *Oct. 19, 2021

(54) SECURITY SYSTEM, DEVICE, AND METHOD FOR INTERNET OF THINGS NETWORKS

(71) Applicant: MISSION SECURE, INC., Charlottesville, VA (US)

(72) Inventors: Daniel D. Park, Charlottesville, VA (US); John Mark Baggett, Deer Park, TX (US); Edward C Suhler, Earlysville, VA (US); Rick A. Jones, Charlottesville, VA (US); Gary W. Huband, Crozet, VA (US); Paul D. Robertson, Shenandoah, VA (US); Austin C. Suhler, Earlysville, VA (US); Casey Silver, Forest, VA (US)

(73) Assignee: MISSION SECURE, INC., Charlottesville, VA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/702,944

(22) Filed: Dec. 4, 2019

(65) Prior Publication Data

US 2020/0106743 A1    Apr. 2, 2020

Related U.S. Application Data

(63) Continuation-in-part of application No. 15/414,441, filed on Jan. 24, 2017, now Pat. No. 10,530,749.
(Continued)

(51) Int. Cl.
*H04L 29/06* (2006.01)
*H04L 12/24* (2006.01)
(Continued)

(52) U.S. Cl.
CPC ......... *H04L 63/0245* (2013.01); *G06N 20/00* (2019.01); *H04L 41/06* (2013.01); *H04L 63/308* (2013.01); *H04L 67/12* (2013.01)

(58) Field of Classification Search
CPC ...................... H04L 63/1425; G06F 17/30958
See application file for complete search history.

(56) References Cited

U.S. PATENT DOCUMENTS 8,782,771 B2    7/2014    Chen
9,613,512 B2    4/2017    Williams
(Continued)

OTHER PUBLICATIONS

Office Action issued in U.S. Appl. No. 15/414,441 dated Apr. 4, 2019.
(Continued)

*Primary Examiner* — Mahfuzur Rahman
(74) *Attorney, Agent, or Firm* — Rossi, Kimms & McDowell LLP

(57) ABSTRACT

A protection system, method, and a security device can protect an Internet of things (IOT) system having connected hardware equipment, including at least an interface that can receive a control communication for controlling at least one connected device. They feature tasks/steps that intercept control communication between a controller and a connected device, determine whether the received control communication contains an undesirable control command, and either pass or block the received control communication to the connected device depending on whether the received control communication contains an undesirable control command. The security device can be disposed between a source of communication in an IOT network and the connected device for protection.

17 Claims, 18 Drawing Sheets

Related U.S. Application Data

(60) Provisional application No. 62/412,143, filed on Oct. 24, 2016.

(51) Int. Cl.
 H04L 29/08 (2006.01)
 G06N 20/00 (2019.01)

(56) References Cited

U.S. PATENT DOCUMENTS

| | | |
|---|---|---|
| 10,049,564 B2 | 8/2018 | Tegeder |
| 2009/0299542 A1 | 12/2009 | Nuqui |
| 2011/0039237 A1 | 2/2011 | Skare |
| 2012/0266209 A1 | 10/2012 | Gooding |
| 2012/0323381 A1 | 12/2012 | Yadav |
| 2014/0109182 A1 | 4/2014 | Smith |
| 2015/0005968 A1 | 1/2015 | Dorough |
| 2015/0161155 A1 | 6/2015 | Pletcher |
| 2015/0277406 A1 | 10/2015 | Maturana |
| 2015/0281278 A1 | 10/2015 | Gooding |
| 2015/0281453 A1 | 10/2015 | Maturana |
| 2015/0287318 A1* | 10/2015 | Nair ............... G05B 19/418 340/5.52 |
| 2015/0350914 A1* | 12/2015 | Baxley ............... H04L 63/02 726/11 |
| 2016/0127931 A1* | 5/2016 | Baxley ............... G06T 7/60 455/67.16 |
| 2016/0149861 A1 | 5/2016 | Batke |
| 2016/0182309 A1 | 6/2016 | Maturana |
| 2016/0210832 A1* | 7/2016 | Williams ............ H04L 63/304 |
| 2016/0330225 A1 | 11/2016 | Kroyzer |
| 2017/0025040 A1 | 1/2017 | Maturana |
| 2017/0052524 A1 | 2/2017 | Kunz |
| 2019/0349426 A1* | 11/2019 | Smith ............... H04L 45/20 |

OTHER PUBLICATIONS

Notice of Allowance issued in U.S. Appl. No. 15/414,441 dated Aug. 22, 2019.

* cited by examiner

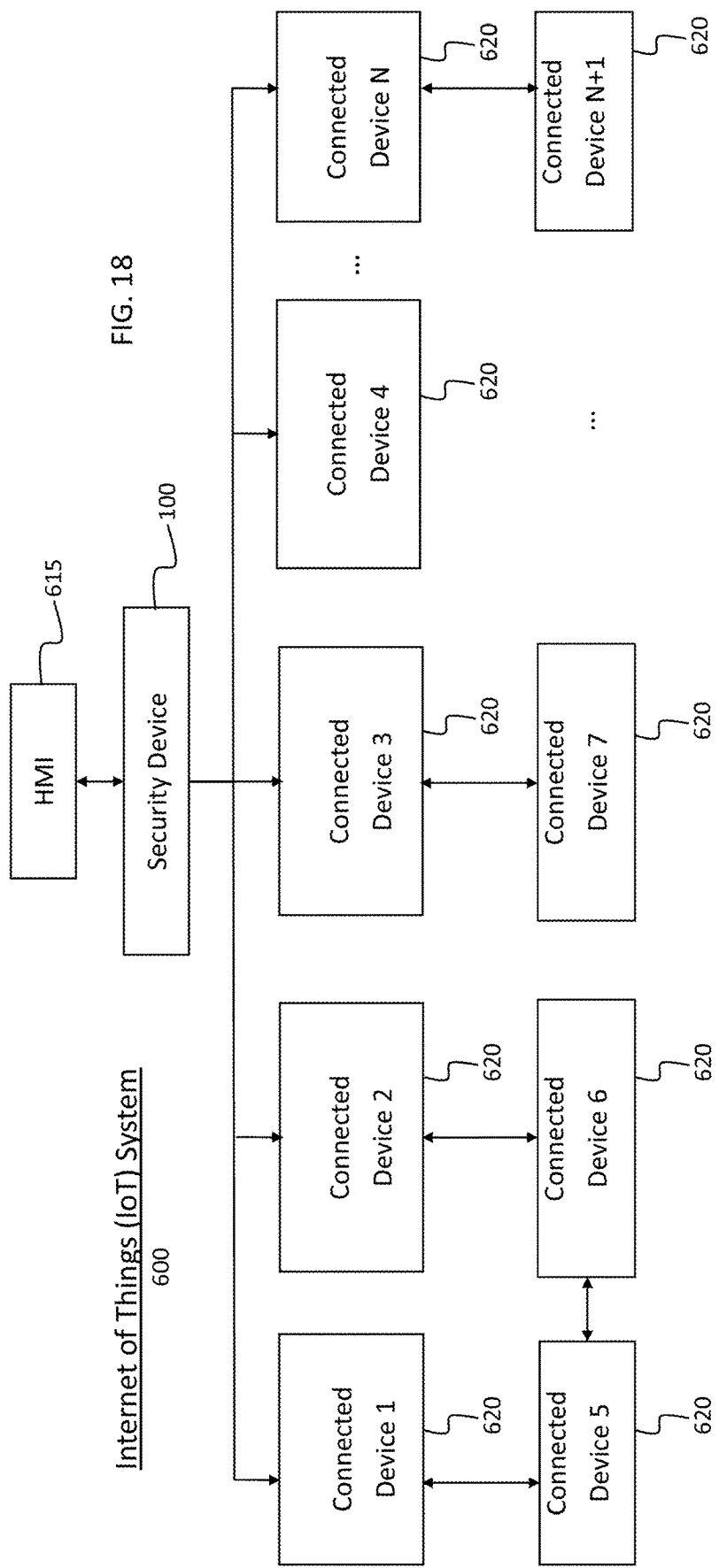

SECURITY SYSTEM, DEVICE, AND METHOD FOR INTERNET OF THINGS NETWORKS

This application is a continuation-in-part of U.S. patent application Ser. No. 15/414,441 filed Jan. 24, 2017, which claims the priority benefit of U.S. Provisional Application No. 62/412,143 filed Oct. 24, 2016, the entire disclosures of both of which are hereby incorporated herein by reference.

BACKGROUND

The control devices that make up control systems are increasingly interconnected to communication networks for purposes of automation, process efficiency, and safety. Control systems in a wide range of environments including, but not limited to, manufacturing, oil and gas production and processing, transportation, energy production and transmission, UAS (Unmanned Aerial Systems), automated vehicles, and others all share common control characteristics—they include one or more logic circuits responsible for controlling physical devices to operate physical processes. Those control devices can be networked together over operational technology (OT) networks, also known process control networks (PCNs) or platform information technology, to provide process control systems with the ability to enable control and monitoring of the control system behavior and provide convenience to operators responsible for running the system.

Because of this interconnectivity, these systems can be vulnerable to cyber security threats. Although typical cyber security protections applied in information technology (IT) networks, such as firewalls, virus protection, network segmentation, and virtual networks, can be applied to help reduce the attack apertures for cyber attackers to launch attacks in the OT network, they do little to address the specific vulnerabilities faced by OT networks that are designed for process efficiency and safety, not cyber security. There is, in fact, little cyber security designed into conventional control systems, let alone a host of legacy control systems that have no security at all.

As shown in FIG. 3, a conventional OT system typically includes industrial control devices (ICDs) 320 and industrial devices 330, such as for electrical distribution. Conventional control systems are designed using a hierarchical control device structure to control system processes. This begins, at the lowest level (level 0), with the industrial devices 330 that actually perform a function within the OT system. These industrial devices 330 includes physical devices, such as valves, relays, pumps, compressors, electronic breakers, starter motors, and actuators, and also arrays of sensors that provide data about the state of a system, such as pressure, temperature, current and voltage flow, flow rate, level, and indicate how the system is performing. The control and sensor data flows through a series of industrial control devices (ICDs) 320 that house the logic that controls how a system should behave. Some of the functions of the system are controlled automatically by ICDs 320 and some are controlled by operators whose view into the system is provided by Human Machine Interfaces (HMIs) 315. HMIs 315 receive information from the ICDs 320 and display a computer graphics view of the control system, its state, and provide controls that allow the operator to change or control the parameters that run the control system process.

The ICDs 320 can be implemented by commercial control systems, such as programmable logic controllers (PLCs) or proprietary embedded control technology designed and built for particular devices (e.g., industrial relay). It is common for the ICDs 320 to reside on a wired or wireless network. These networks can be the same data networks that are used to carry data and command and control functions. The control devices 320 and industrial devices 330 are inherently not secured against cyber threats. Communication protocols, such as a common industrial protocol (CIP) can provide a unified communication architecture to manage the communications within the OT network and between control system devices.

FIG. 4 shows the Purdue ICS (Industrial Control System) Reference Architecture 300 illustrating various levels at which operations are performed in a control system. The Purdue ICS Reference Architecture is described, for example, at https://en.wikipedia.org/wiki/Purdue_Enterprise_Reference_Architecture. The Purdue ICS Reference Architecture 300 includes five levels of operations. Level 0 includes the process I/O devices corresponding to the industrial devices 330, and is associated with the actual physical processes performed by these devices. Level 1 includes intelligent devices, such as ICDs 320 and safety instrumented systems. Level 1 operations include sensing and manipulating the physical process associated with Level 0 devices 320 by providing control logic. Level 2 includes area and supervisory control systems for supervising, monitoring, and controlling the physical processes using an HMI 315, namely supervisory and data acquisition (SCADA) software. Levels 0-3 typically make up the OT system. Then there is typically an interface to the Enterprise IT network (Level 4). That interface point is an important part of the OT network because it can be used to provide access from business application environment in an organization into the control system but also can be a source of cyber security vulnerabilities.

Level 3 of the Purdue ICS Reference Architecture 300 is associated with plant production and operations systems that manage production workflow or operational processes. Management of the business-related activities of the enterprise system is performed at Level 4 of the Purdue ICS model. Typical cyber security devices and solutions available for the information technology space can be used to provide security for Level 3 and 4 operations but are inadequate for providing security against cyber threats for operations at Levels 0-2.

For example, one of the biggest differences between traditional IT-based cyber security for Level 4 operations and control system specific security for OT Levels 0-3 in an OT network is that the primary objective of enterprise and plant IT systems is to protect data (confidentiality), whereas the primary security objective of OT networks is to maintain the integrity of operational processes. Cyber attacks on OT networks can be launched by actors operating outside the OT networks and exploiting security holes at Level 4 systems or by internal actors, such as malicious programs (instructions) embedded within the control processes of Levels 0-3. While traditional IT cyber security solutions can provide some protection against threats to Level 3 and 4 operations or processes, control system specific solutions are required to adequately protect Level 0-2 processes from cyber attacks that can degrade production or operations, cause loss of control, damage equipment, or result in possible safety issues. IT security protection typically does not have the policies, procedures, tools, and expertise in place to manage the Purdue ICS specific Level 2 control systems, Level 1 network and ICDs 330, and the Level 0 industrial equipment or devices 320.

Control systems have some very important differences from an IT system. Solutions for addressing cyber threats in the IT system tend to rely on generating, collecting, and analyzing log information from every level and resource within the IT network. In contrast, an OT system is highly resource limited and most communications within the lowest levels of the PT network are in the form of analog signals, which do not lend themselves to logging and forensic analysis. Further, communications between the HMI and the ICD can be in digital format and need to be compared against the analog signals for data validation and to determine whether the control system is operating normally.

Furthermore, a man-in-the-middle (MITM) adversary with access into the OT network can insert attacks at the most impactful level and time to mask information reported up the OT network hierarchy (such as the HMI or operations and control systems where decisions are made), creating a false state of the physical control system. Without having the log information that starts at the most base level (Level 0) and up, there is no way to perform the data fusion needed to enable the analysis/correlation necessary to indicate the presence of a MITM attack.

In addition, OT networks can have a reduced level of system resource capacity as compared to an IT network. Typical IT networks feature operate within a network with greater capacity (e.g., bandwidth) and tolerance (e.g., longer latencies) than are acceptable in a deployed OT network. Resource constraints and the requirement for reliable process control and monitoring for the safe and stable operation of ICS processes play a role in this problem. This forces limitations on the potential of what can be captured, stored, and processed within the control system.

Similar problems are also present in Internet of things (IOT) systems. An IOT can be defined as a system of interrelated computing devices, mechanical and digital machines, sensors and objects that communicate with each other and with external devices to provide various functions in support of both human and machine-based activities. The IOT system is made possible by the convergence of multiple technologies: real-time analytics, machine learning, commodity sensors, and embedded systems. However, the convergence of these items with the ubiquitous availability of network and communications channels that make these types of systems possible also introduces new vectors for cyber attacks. Traditional fields of embedded systems, wireless sensor networks, control systems, automation, and others contribute to enabling the Internet of things. There are a number of serious concerns about dangers in the growth of 10T, especially in the area of security. Most IOT systems have interconnected devices that communicate with a control application via a gateway that pre-processes the collected data. The control application can reside on the cloud or in an information processing system connected to the gateway or to the devices via the Internet or another communication protocol. While some gateways can provide security between communications from the gateway to the cloud, communications between the connected devices to the gateway are susceptible to cyber intrusion, security failure, and IOT system impacts.

There remains evermore a greater need to protect OT and IOT networks, which have little or no cyber-security protection. The present development addresses this need.

SUMMARY

One aspect of the present invention is a method of protecting an operational technology (OT) system having connected hardware equipment, including at least a communication interface configured to receive a control communication and an industrial control device (ICD), which can be a logic circuit, for controlling at least one industrial device.

The method can include a receiving step, a first determining step, a passing step, and a blocking step. The receiving step receives control communication from the communication interface. The first determining step determines whether the received control communication contains an undesirable control command. The passing step passes the received control communication to the ICD when the determining step does not determine that the received control communication contains an undesirable control command. The blocking step blocks the received control communication to the ICD when the determining step detects that the received control communication contains an undesirable control command.

The method can include a logging step that stores, in a storage device, forensic data for the ICD and at least one industrial device being controlled by the ICD. The forensic data can be stored when the first determining step determines that received control communication contains an undesirable control command.

The OT system can further include at least one human machine interface (HMI), and the method can include an alarming step that sends an alarm to the HMI when the first determining step determines that the received control communication contains an undesirable control command.

The method can include a first analyzing step that analyzes the received control communication. The determining step determines the received control communication contains an undesirable control command based on at least one of whether the control communication is received from a validated network source or the content of the control communication.

The method can include an obtaining step that obtains configuration information from the at least one industrial device being controlled by the ICD, a second analyzing step that analyzes the obtained configuration information, and a second determination step that determines whether the obtained configuration information contains an undesirable configuration based on a result of analysis in the second analyzing step.

The second analyzing step can compare the obtained configuration information with a reference source and the second determining step determines whether the obtained configuration information contains an undesirable configuration based on a result of comparison made in the second analyzing step.

The method can include an updating step that updates the reference source when the second determining step determines that the obtained configuration information contains an undesirable configuration.

The method can include a logging step that logs forensic data for at least one industrial device being controlled by the ICD when the second determining step determines that the obtained configuration information does not contain any undesirable configuration.

The OT system includes a security device that intercepts communication between the ICD and the communication interface. The security device contains a memory and a processor configured to implement instructions stored in the memory, and execute the receiving, first determining, passing, and blocking steps.

The method can include an authentication step that authenticates communication between the security device and the communication interface.

The method can includes a learning step that learns normal behavior patterns of system processes operating in the OT system and the equipment in the OT system, identifies anomalous system behaviors and deviations in system state that indicate potential cyber incidents or general system failures, and differentiating there between. The learning step can use artificial intelligence (AI) hosted algorithms to detect inconsistent system state information.

The method can include a maintenance step that provides integration of information from maintenance schedules, alarm conditions in the OT system, and from lifecycle curves of mechanical devices operating within the OT system to aid in anomaly detection where the failure occurs different from the expected lifecycle curve. The information can aid in addressing issues of false detections within incident detection algorithms used to evaluate the state in the OT system.

The method can include a monitoring step that monitors the at least one ICD and the at least one industrial device.

The method can include a validation step that provides data validation/consistency to ensure that OT system data presented to an operator for use in system control is trusted and not altered by a cyber attack.

Another aspect of the present invention is a protection system for the OT system. The system can include an I/O interface, an ICD, and a security device. The I/O interface communicates with a source that provides control communication. The ICD controls at least one industrial device. The security device, which controls communication between the ICD and the I/O interface, includes a memory and a processor configured to implement instructions stored in the memory, and execute the following tasks. A receiving task receives control communication from the communication interface. A determining task determines whether the received control communication contains an undesirable control command. A passing task passes the received control communication to the ICD when the determining task does not determine that the received control communication contains an undesirable control command. A blocking task blocks the received communication to the ICD when the determining task determines that the received control communication contains an undesirable control command.

Another aspect of the present invention is the security device having a communication interface configured to communicate with an OT network, for the OT system described above.

Another aspect of the present invention is a non-transitory computer-readable storage device storing a program executable by a processor of a security device for protecting the OT system, and executes the method described above.

Another aspect of the present invention is a method of protecting an Internet of things (IOT) system having connected hardware equipment, including at least a security device having a communication interface, a memory, and a processor electrically connected to the memory, the processor configured to implement instructions stored in the memory to execute steps of the method.

The method can include an intercepting step, a first determining step, a passing step, a blocking step, and a correcting step. The intercepting step intercepts a communication between a controller and a connected device over an IOT network, the communication including a control communication for controlling the connected device. The first determining step determines whether the received control communication contains an undesirable control command. The passing step passes the received control communication to the connected device when the first determining step does not determine that the received control communication contains an undesirable control command. The blocking step blocks the received control communication to the connected device when the first determining step detects that the received control communication contains an undesirable control command. The correcting step inserts communication into the connected devices or into the communications to put the device or communication into a different state.

BRIEF DESCRIPTION OF DRAWINGS

It is to be understood that the attached drawings are for purposes of illustrating aspects of various embodiments and can include elements that are not to scale.

FIG. 18 shows an exemplary IOT system including a security device.

DETAILED DESCRIPTION

The present development relates to cybersecurity platforms and in particular, to platforms that can be utilized by multiple types of devices or systems including those that do not have native security provisions.

In one embodiment of the invention, the present development provides a new layer of cyber protections for control device that do not have native security functionality designed into them. The protections are focused on the physical devices within OT networks or PCNs that control physical processes, and the devices that perform the physical processes in the OT system, also referred herein as a control system (CS). Specifically, protections can be embodied in a security device 100 that monitors network traffic within the OT network, such as that between an HMI 315, ICDs 320 (also referred to herein as control devices), and industrial equipment or devices 330 in ICS. The security device can detect and block undesirable control system commands leading to anomalous system behavior.

The OT system, including the ICD, can include various computing devices, controllers, network equipment, such as routers and switches, and storage, that are connected to each other and provide communication within the OT network. The computing devices can be configured to execute instructions provided by programs implementing methods of providing security in the OT system. One or more of the computing devices each can have one or more programs associated therewith. Executing the instructions provided by the programs can include performing security functions, such as authentication, firewall, monitoring and detection of unauthorized control commands, access control, parameter and configuration assurance, anomalous behavior detection, and data, collection, storage, and analysis.

Figure 1:
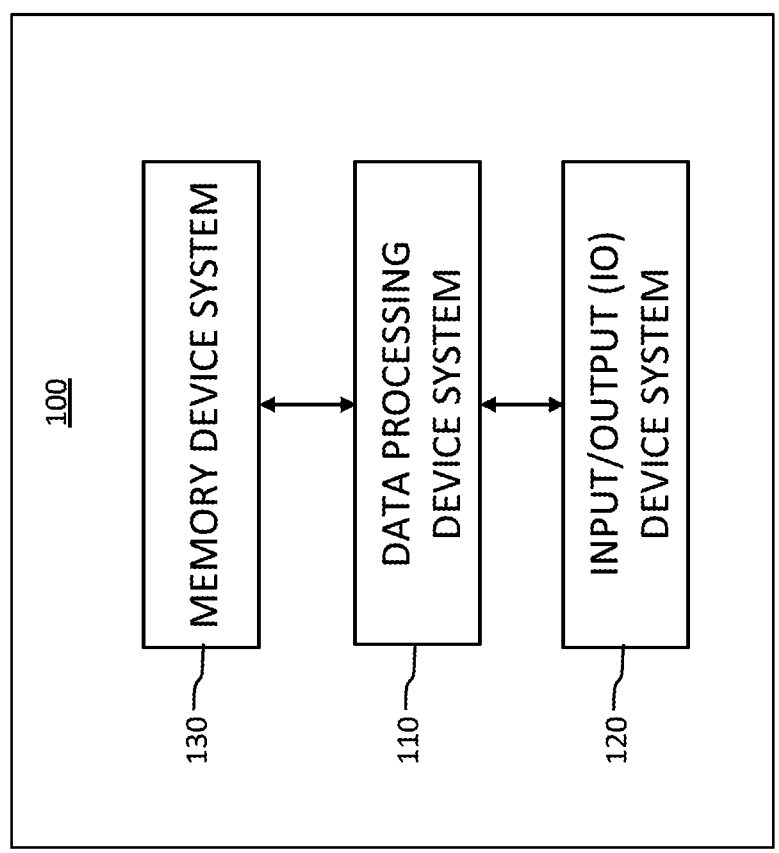
FIG. 1 shows the functional systems of a computing device usable in the present security device.
Figure 2:
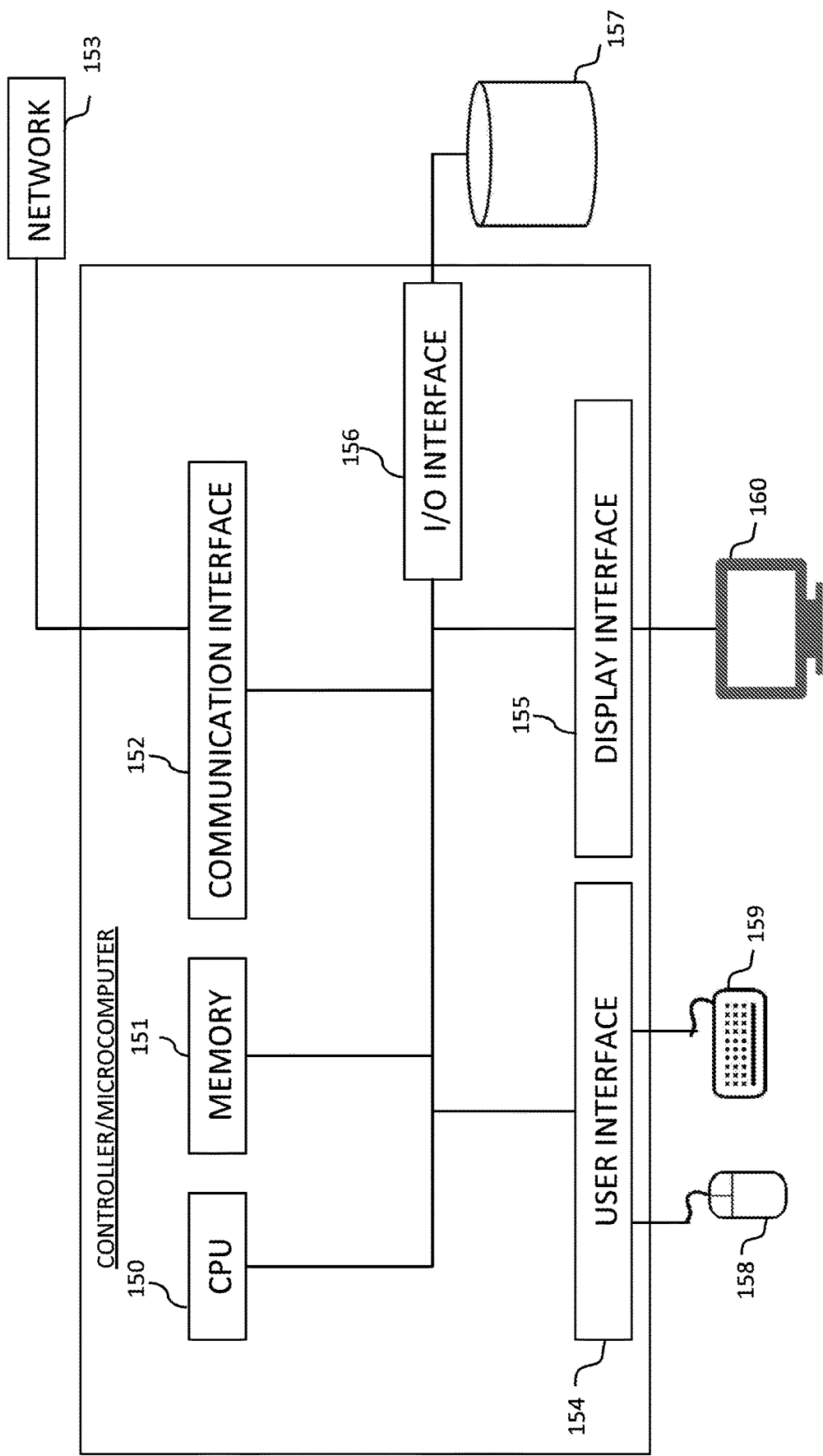
FIG. 2 shows a computing device usable in the present security device.
Figure 3:
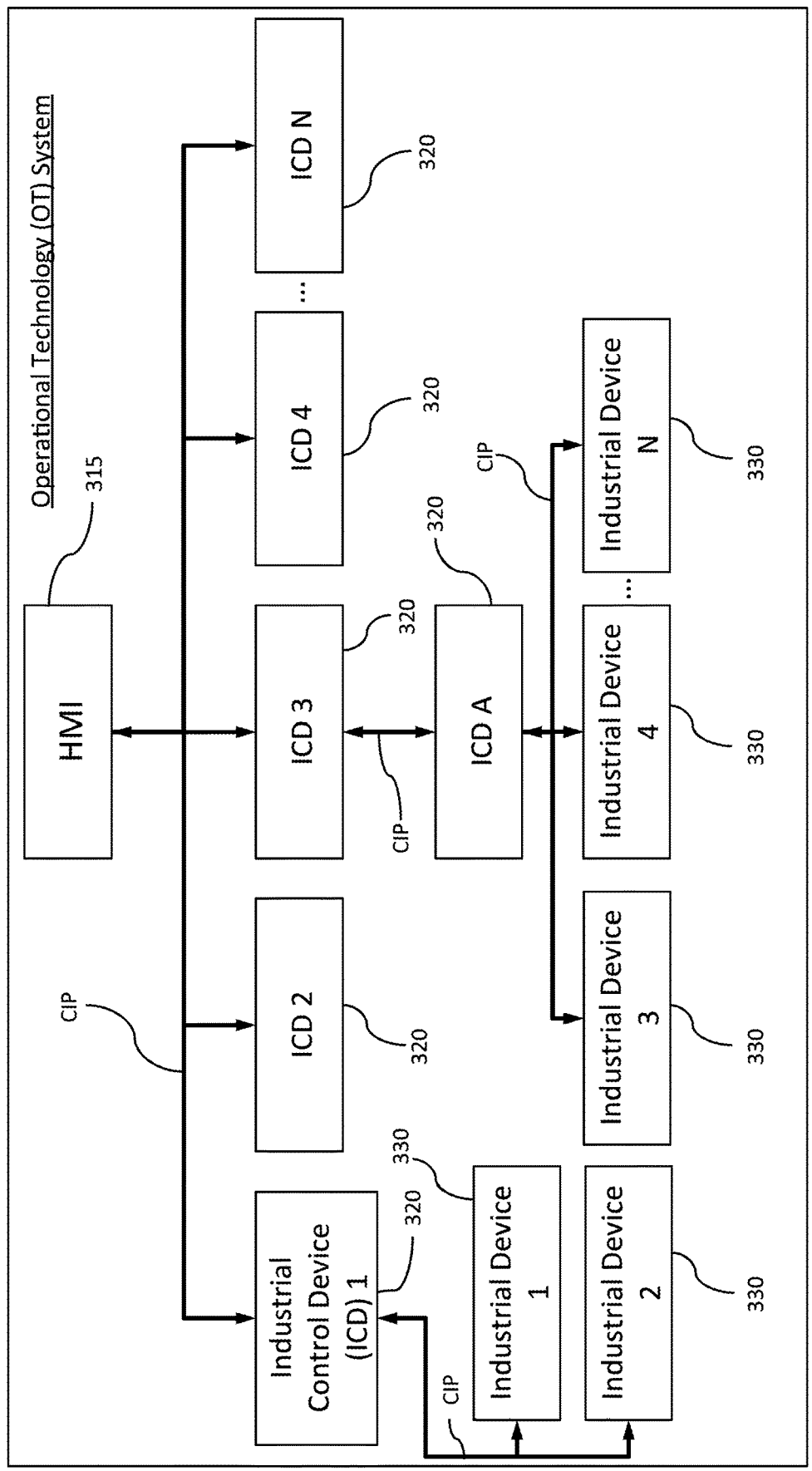
FIG. 3 shows a known exemplary hardware arrangement in an OT system.
Figure 4:
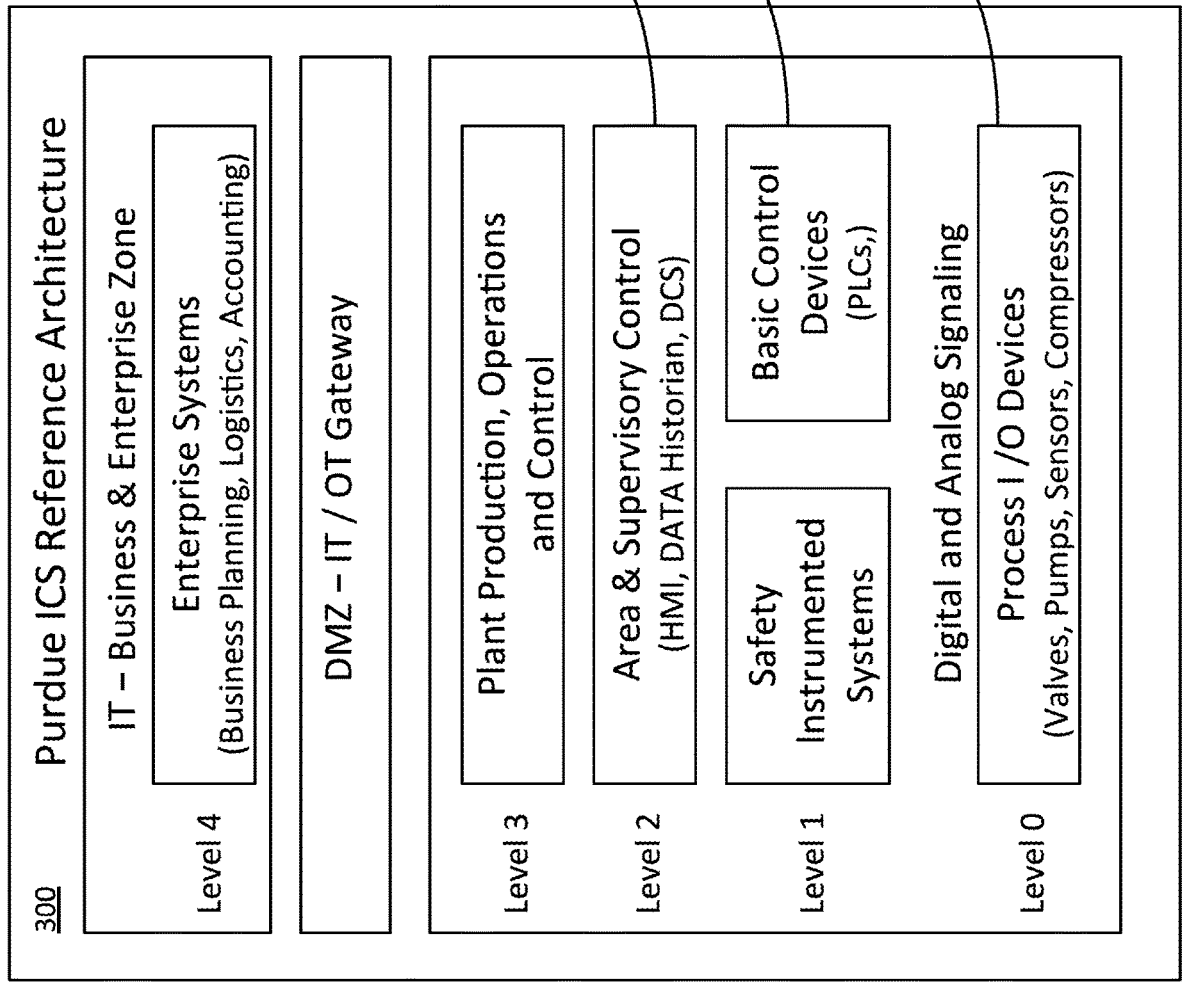
FIG. 4 shows a Purdue ICS Reference Architecture.
Figure 5A:
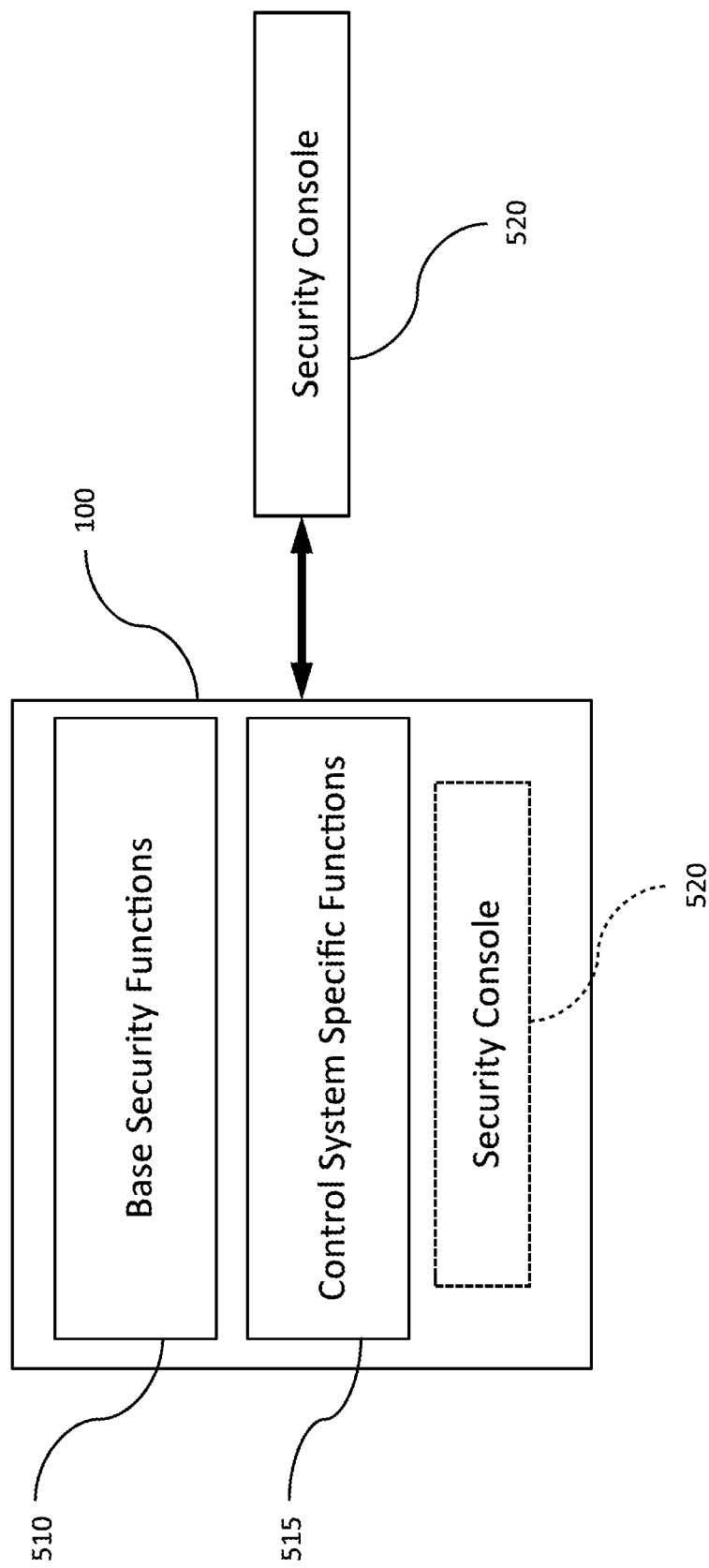
FIG. 5A shows a basic configuration of an embodiment of the present security device.
Figure 5B:
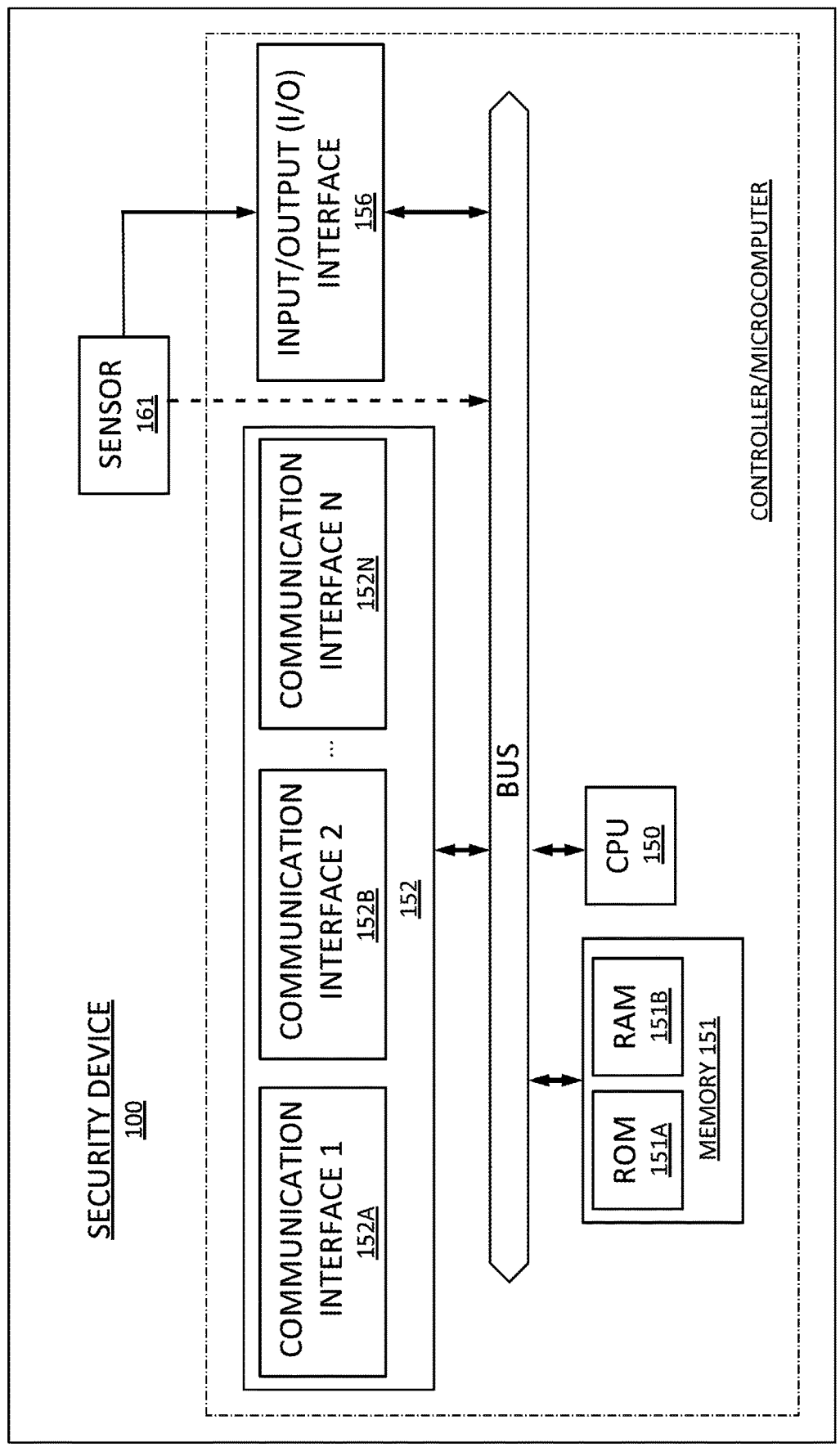
FIG. 5B schematically shows an exemplary controller usable in the present security device.

FIG. 1 schematically illustrates the functional systems of a computing device, namely a controller of FIG. 2 or 5B, that can be implemented in the present security device 100. The functional systems include a data processing device system 110, an I/O device system 120, and a processor-accessible memory device system 130. The processor-accessible memory device system 130 and the input-output device system 120 are communicatively connected to the data processing device system 110.

The data processing device system 110 includes at least one processor that implements or executes, in conjunction with other devices, such as one or more of those in the OT system or network, at least one control program for protecting the devices in the OT system. When referring to "data processing device," "data processor," "processor", "controller," "computer," and "computing device," they can be interchangeable, and corresponds to a CPU (central processing unit), a desktop computer, a laptop computer, a mainframe computer, a tablet computer, a personal digital assistant, a cellular phone, a Raspberry PI, a logic circuit, such as a programmable logic array (PLA), a field programmable gate array (FPGA), a single board computer (SBC), or any other device configured to process data, manage data, or handle data.

The memory device system 130 includes at least one processor-accessible memory device that stores data/information, including the information needed to execute the control programs. The memory device system 130 can be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, can include at least one processor-accessible memory device residing within a single data processing device.

The "processor-accessible memory" and "processor-accessible memory device," refers to any processor-accessible data storage device, whether volatile or nonvolatile, such as registers, floppy disks, hard disks, Compact Discs, DVDs, flash memories, ROMs, and RAMs.

Although the memory device system 130 is shown separately from the data processing device system 110 and the I/O device system 120, the memory device system 130 can reside completely or partially within the data processing device system 110 or the I/O device system 120. Similarly, although the I/O device system 120 is shown separately from the data processing device system 110 and the memory device system 130, it also can reside completely or partially within the data processing system 110 or the memory device system 130, depending upon the contents of the I/O device system 120. Further still, the data processing device system 110, the I/O device system 120, and the memory device system 130 all can reside within the same device, such as in a single application-specific integrated circuit (ASIC).

FIG. 2 schematically shows a computing device that can be used in the present development. The data processing device system 110 of FIG. 1 can be implemented by a processor 150. The memory 151, I/O (input/output) interface 156, and non-transitory storage medium 157 correspond to the memory device system 130 of FIG. 1. The user interface 154, mouse 158, keyboard 159, display interface 155, and display 160 can be part of the I/O device system 120 of FIG. 1. The communication interface 152, which connects to a network 153 for communicating with other computing devices or control devices, also can be part of the I/O device system 120. As described later with respect to FIG. 5B, the computing device can be configured as a controller for the security device 100, which can include one or more sensors 161.

The I/O device system 120 thus can include the mouse 158, a keyboard 159, and the display 160, which can have a touch screen. It can also include another computer, or any device or combination of devices from which a desired selection, desired information, instructions, or any other data is input to the data processing device system 110. The I/O device system 120 can include any suitable interface for receiving information, instructions or any data from other devices and systems.

The I/O device system 120 also can include an image generating device system, a display device system, a speaker device system, a processor-accessible memory device system, or any device or combination of devices to which information, instructions, or any other data is output from the data processing device system 110. In this regard, if the I/O device system 120 can include a processor-accessible memory device, such memory device can form part or all of the memory device system 130. The I/O device system 120 can include any suitable interface for outputting information, instructions or data to other devices and systems. In this regard, the I/O device system can include various other devices or systems.

Further, it is understood that information or data can be operated upon, manipulated, or converted into different forms as it moves through various devices or workflows. In this regard, unless otherwise explicitly noted or required by context, it is intended that any reference herein to information or data can include modifications to that information or data. For example, "data X" can be encrypted for transmission, and a reference to "data X" is intended to include both its encrypted and unencrypted forms.

FIGS. 5A-B show a security device 100 according to an exemplary embodiment. The security device 100 provides new layers of protection for Level 0 and 1 devices in OT systems, as described by the Purdue ICS Reference Architecture. The protection can include two classes of security functions, namely base security functions 510 and control system specific security functions 515 used to augment existing non-protected devices. Both types of security functions are desirable to provide appropriate security against cyber threats. The present security device 100 includes at least one of the base security functions 510 or control system specific functions 515. The base security functions 510 provide a base set of security functionality that should be in place to augment devices with little to no security. Examples of such base security functions are described in co-pending U.S. patent application Ser. No. 15/149,469 filed May 13, 2016, the entire disclosure of which is herein incorporated by reference. The control system specific functions 515 include novel security features designed specifically to address the vulnerabilities within the CS.

Figure 12:
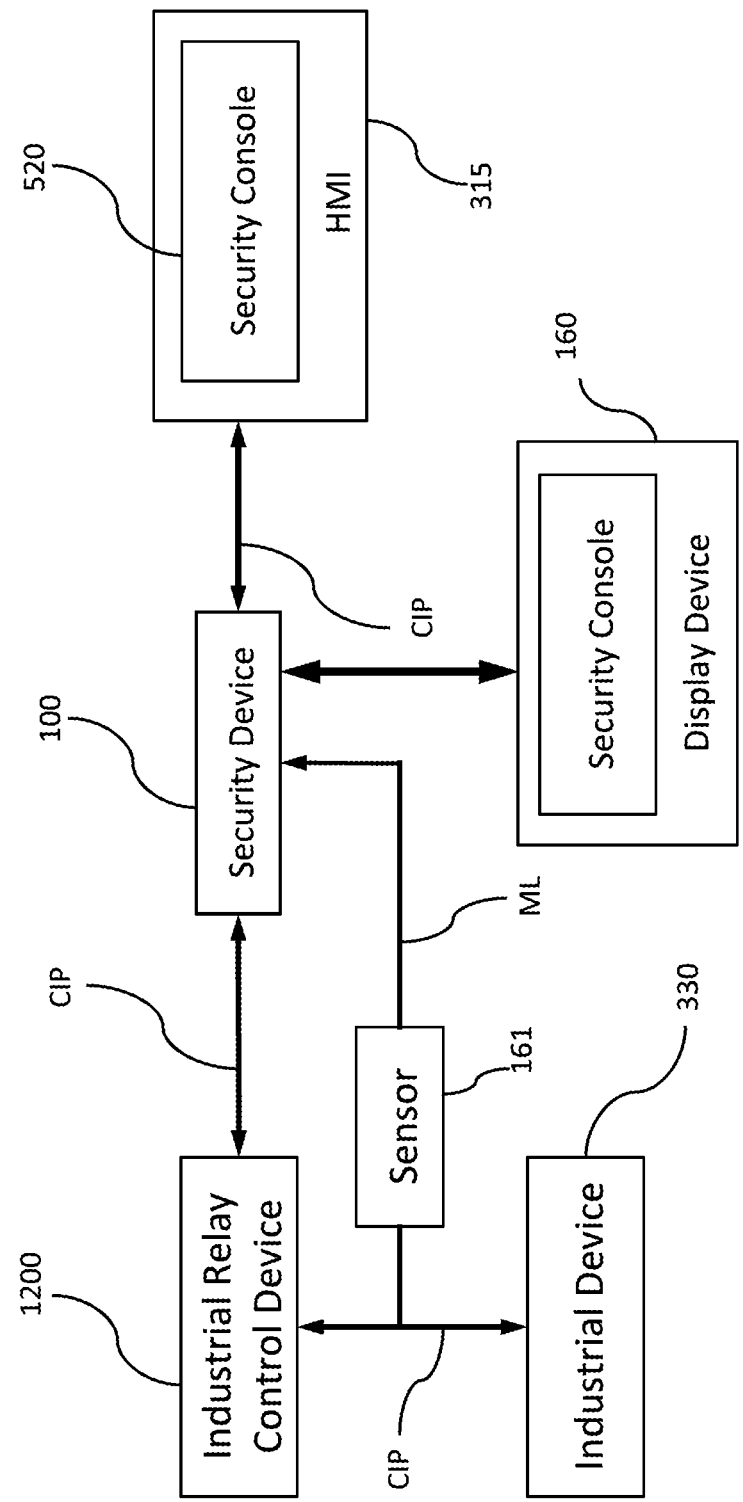
FIG. 12 shows another exemplary OT system including a security device.

Referring to FIGS. 5A and 12, the security device 100 can include a security console 520. The security console 520 can be provided within the security device or can be provided as a program operating at a client terminal outside the security device, such as the HMI. The security console 520 can provide information associated with normal and anomalous operations within the OT system, provide alerts indicating events or threats that require intervention or attention, or provide notification of measures taken in response to detected cyber threats within the OT system. The security console 520 includes a user interface that outputs information associated with the OT network for analysis, corrective action, or alerting.

The security console 520 can work in conjunction with at least one security device 100. To that end, each of the security devices 100 can be configured to report its measurements or monitoring information to the security console 520, which can store the received data, visualizes it to the operator, and facilitates automated or manual response to threats and discrepancies detected based on data received from the respective security device 100. The security console 520 can be customized as applicable to a particular protected control system 400 (see FIG. 6). As the actual measurements, analysis, and actions can differ for different control systems, security console 520 can include a library of a wide variety of predefined components from which the appropriate user interface and response logic can be easily assembled.

The security console 520 can be implemented as a standalone system as shown in FIG. 5A, which can be physically located in the field, near the protected control system 400, at another location (e.g., a datacenter), or in a cloud architecture and accessed over the Internet. The security console 520 also can be provided by software programs residing within the security device 100, as shown in FIG. 5A in phantom, in conjunction with a display device. Alternatively, the security console 520 can be implemented both as a standalone system and also be run by software programs residing within the security device 100 in conjunction with a display device, which can have a touch screen, as illustrated in FIG. 12.

FIG. 5B schematically shows one embodiment of a controller that can be implemented in the security device 100. The security device 100 can include at least one sensor 161, a plurality of communication interfaces 152A, 152B . . . 152N (collectively referred to as 152), at least one I/O interface 156, memory 151, and CPU 150 communicating via a bus within the security device 100. The memory 151 can include a RAM 151A and a ROM 151B. The memory 151 also can be configured as a non-volatile computer storage medium, such as a flash memory, instead of the RAM and the ROM, which can be removable, such as using a conventional flash card.

Multiple communication interfaces (I/F) 152A, 152B can be included. The communication I/F can be either wired or wireless for communicating with the OT networks. For example, the communication I/F can be configured as Ethernet or USB. The USB or the Ethernet technology also can be used to power the security device 100 itself.

The security device 100 can be implemented by many different computing devices 100 to provide protections in different architectures, to protect ICD 320 and industrial devices 330 within the OT system. The security device can be provided by hardened micro-computer platforms using a security certified (to appropriate evaluation assurance levels) Real-Time Operating System (RTOS) to interface with select mission-critical elements of the OT system. The micro-computers can be Defense Information Systems Agency Security Technical Implementation Guide (DISA STIG) compliant. The security device can include an API for interfacing to forensics tools such as, for example, Autopsy™, FTK™, or EnCase™.

For example, the security device 100 can comprise one or more single board computers (SBCs) hardware component such as, but not limited to, a Reduced Instruction Set Computer (RISC) or an Advanced RISC Machines (ARM) processor available from Advanced RISC Machines, Ltd. The security device 100 can use an SBC such as, for example, a Raspberry Pi™ SBC available from the Raspberry Pi Foundation at http://www.raspberrypi.org/, a BeagleBone Black ARM-based SBC available from the BeagleBoard.org Foundation at http://www.beagleboard.org, a Gumstix Overo Firestorm™ ARM-based SBC from Gumstix, Inc. Of Redwood City, Calif. at http://www.gumstix.com/, a MinnowBoard or MinnowBoard MAX Intel® Atom™ based processor available from Minnowboard.org (http://www.minnowboard.org/), the Edison Development Platform available from Intel Corporation of Santa Clara, Calif. (http://www.intel.com/content/www/us/en/do-it-yourself/edison.html), a Hummingboard™ SBC available from SolidRun Ltd. Of Migdal Tefen, Israel, Liva BAT-Mini PC's made by ECS-Elite Group of Taipei, Taiwan, the Udoo Neo SBC from SECO SRL of Arezzo, Italy, the phyBOARD SBC from Phytec of Mainz, Germany, or another embedded hardware platform. Accessory boards, such as the crypto cape for the Beaglebone Black and the Spark Fun accessory boards, for the Intel Edison SBC environment, also can be used.

Each of the above-described embedded hardware platforms support various operating systems and development environments, such as Linux, including Debian-based, Arch-LINUX-based, Raspbian, or Open Berkeley Software Distribution (BSD) versions, or Microsoft® Windows® 7, 8.1 or 10.0 (for example, for Minnowboard Max implementations). Software or programmed instructions executed by the SBC or embedded hardware platform of the security device 100 to configure the security device 100 to perform base security functions 510 or control system specific security functions 515 as described herein can be written in the C or Python programming languages, for example, or the like, without limitation. Security data patterns (for use in comparison to received or monitored data) can also be provided using these development environments.

Base security functions 510 can include one or more of encryption, authentication, firewall, access control, monitoring and detection of unauthorized control commands, or control command review and blocking.

As an example, the security device 100 can include an encryption function for encrypting information flowing between network devices at Levels 2-5 in the Purdue ICS Reference Architecture, such as an HMI at an operator's control station, and the physical devices and equipment (e.g., industrial devices 330) at Level 0. All IP traffic to or from the Level 0 devices, namely the industrial devices 330, is routed through the security device 100. The information can be encrypted and authenticated using security certificates.

For example, the security device 100 can include user authentication protocols applied within the OT network architecture to either complement or enhance existing base security capabilities or to provide new authentication capabilities where none exist. This includes authentication protocols, such as two-form factor authentication. All IP traffic to or from the Level 1 control devices 320, including any user ID/name and password that are not encrypted as they pass through the OT network, are routed through the hardened security device 100, which provides a platform for secure user authentication. User access is controlled via a role-based authorization mechanism using a combination of authentication protocols best suited to each deployment, and all operations can be tracked for audit and forensic purposes. The underlying operating system also can be protected by advanced methods such as kernel module signing to assure only authorized code is being executed.

The security device 100 also can include firewall functionality to block or to allow network traffic to and from the ICDs 320 being protected at Level 1 to other devices at Levels 2, 3, 4, and 5 in the Purdue ICS Reference Architecture. The security device 100 also can provide protection against unauthorized access by external devices to control the ICDs 320 through other protocol interfaces commonly used to program devices, such as RS-232 serial communication or USB interfaces. The security device 100 can include functions to determine whether a malicious actor is attempting to access the OT network without proper access credentials or from an unauthorized network IP address.

The security device 100 also can include functions for monitoring network traffic passing to the protected device from the OT network and accept control commands for ICDs 320 from only authenticated sources within the OT network. Such functions provide increased security against cyber attacks on ICDs 320 that are inherently designed without cyber security protection.

Referring to FIGS. 7-14, the security device 100 can be inserted between the HMI at Level 2 and the ICD 320 at Level 1 to intercept communications between the HMI and the ICD. The security device 100 can also integrate data from other sensors or industrial devices 330 in the OT system. The security device 100 compares the behavior of the industrial devices controlled by the ICD 320 and analyzes to detect system behavior that is different from the expected system behavior. For example, if commands coming from the HMI indicate that there should be a change in a valve setting that is outside the normal, safe operating parameters programmed into the security device, this can indicate an attacker has compromised the OT system. Further, if the ICD 320 issues such commands to the industrial devices 330 without a corresponding action on human machine interface (HMI), where such configuration commands should originate, this would indicate a behavior that does not make logical sense and could indicate a cyber attack. In essence, the security device 100 can verify that what the operator in the control room is seeing, via the HMI, is what the security device is seeing. The security device 100 is also validating the commands from the ICD 320 by comparing them to commands issued by the HMI and to the operational environment (i.e., pressure, flow rates) monitored by the security device.

The security device 100 can monitor the input and output signals directly for the valves, sensors, and transmitters that comprise the industrial devices 330 using signal and sensor taps provided by a monitoring line (ML). This provides the security device 100 with the lowest level of assurance as to what a valve or transmitter is actually doing and its current state, rather than what the ICD 320 is telling the operator via the HMI. Only at this level can security be effective against an advanced attacker. Thus, the security device 100 can process and monitor the voltage level or other signal directly between the industrial device 330 and the ICD 320, rather than through reading or analyzing log data, HMI output data, or commands flowing through the OT network. The log data or HMI data can be compared back to the actual signals detected at the industrial device 330 and ICD 320.

In another attack scenario, a sophisticated attacker could compromise a control system in the OT network, such as a power system, by attacking the electronic control system, for example, by stopping power to an instrument air compressor. The compressor would lose air pressure, causing valves relying on constant air pressure from such compressor to shut down. In this case, it could cause an automatic shut down of the entire power system. Inserting the security device 100 configured for such protection, into the OT network of the electronic control system, this type of attack can be detected, the operator informed via the HMI or the security console 520, for corrective action.

In the above scenarios, the security device 100 can include control programs for further analysis, operator notification, or corrective actions. The security device 100 can also include programs for taking automated actions to reset the valve to a desired setting (i.e., open or closed). The security console 520 can also serve as the interface for an alarm, where the operator can receive information from the security devices 100, that informs the operator of possible attacks, to provide for management of corrective actions, and to store information for forensic analysis. Furthermore, there can be a plurality of security devices 100 distributed within the OT network to provide monitoring, detection, and corrective actions either independently or in conjunction with other security devices 100 and the HMI.

The security device 100 also can monitor and detect unauthorized control commands from unauthenticated sources within the control system 400, review the control commands, and blocks the control commands for control devices 320 that do not meet authentication and authorization requirements within the OT network. The control system 400 also can include digitally signed certificates to authenticate the identity of devices that communicate to and from the security device 100. The security device 100 can use digitally signed certificates to manage the authentications from one device to another within the control system 400 including the security device 100, the ICD 320, the industrial device 330, and the HMI.

As previously indicated, the security device 100 includes cyber security protection functions 515 (see FIG. 5A) designed specifically for the control system. These control system specific functions include identifying anomalous system behavior, detecting incidents, providing parameter and configuration assurance for the OT network, providing data validation and consistency, and providing data collection for forensic analysis. For example, the security device 100 can include functions to provide integration of information from maintenance schedules, alarm conditions in the OT system, and from lifecycle curves of mechanical devices operating within the control system to aid in anomaly detection where the failure occurs different from the expected lifecycle curve. This information can aid in addressing issues of false detections within incident detection algorithms used to evaluate the state in the CS. The security device 100 can provide data validation/consistency to ensure that OT system data presented to an operator for use in system control is trusted and not altered by a cyber attack.

The security device 100 can perform incident detection based on analysis of network data collected at Level 1 and electronic data collected at Level 0 by the security device 100 and provide a computing platform for storage and analysis of system data generated by the devices in the OT system. The security device 100 can provide a platform for collection of forensic data for devices at Level 0 and for data at Level 1 in the OT system.

Secured storage for security device data and critical system data also can be provided. In particular, the security device 100 can provide the capability to securely store data collected from the protected control system 400, for monitoring data generated by the for security device 100, and for mission critical data used by the for security device 100. Data can be stored either onboard the security device 100 hardware platform itself using, for example, the memory device system 130, memory 151, or storage 157, can be shared with the security console 520, or a combination of both depending on the needs of the protections and the system being protected. Data from the protected control system 400 can be passively or actively monitored by the security device 100 for different types of security design patterns used by the for security device 100 to detect potential cyber threats. Data needed in the monitoring process can be stored for either live use by the detection algorithms or for possible future forensic analysis purposes. The amount of detail and length of history that the system stores can be configurable.

In addition, data generated by the for security device 100 can include messages about the cyber health of the protected control system 400. For example, results of detection algorithms running across the diverse for security devices 100 operating in the OT system can be used collectively to assess the operation of the protected control system 100, ICD 320, or devices 330. The detection algorithms can be continuously running. In the event of a positive detection of a cyber security event or breach, the security device 100 can generate detection indicators that inform either other system processes within for security device 100 or push the indication to other locations, such as the security console 520, for further processing or analysis. The security device 100 also can be configured to generate automated system corrective actions or to receive corrective actions from the for security console 520, which generates a series of steps that attempts to restore the protected control system 400 to an operative state. All data involved in this process can be maintained in secured storage within the OT network or outside the OT network.

The control system 400 can further include mission critical data among or as part of the security design patterns to define the mission context to the security device 100. For example, such mission critical data can include known correct or good (i.e., gold standard) versions of parameters that guide the operation of the protected control system 400. These gold standard versions of the system parameters can be used for detections or to restore the system state after cyber attacks are detected. In addition, the algorithms that guide the detections in the security device 100 can rely on parameters operative to adjust the sensitivity of the detections and other controls that allow for configuration of the operation of the algorithms that can vary under different applications of the control system 400. Such tuning parameters also can be stored in secured areas within the security device 100 or the OT system.

The security device 100 can provide a monitoring platform for Level 0 and Level 1 devices that permits the security device to learn the normal states and behavior patterns of ICDs 320 and industrial devices 330 that are included within the lowest levels of the OT system (Levels 0 and 1 in the Purdue ICS reference model), and identify anomalous system behaviors and deviations in system state that indicate potential cyber incidents or general system failures. The security device 100 can also differentiate between cyber incidents and general system failures based on the learned states and patterns. The security device 100 learns the normal states and behavior patterns using artificial intelligence (AI) algorithms to detect inconsistent system state information.

THE TABLE

| KNOWN SYSTEM STATES | SECURITY DEVICE LEARNS ORDER TO CREATE NORMAL STATES (EXAMPLES) | CREATE A SECURE SIGNATURE OF STATES | COMPARE ACTUAL STATES TO SIGNATURES | ALERT TO DIFFERENCES |
|---|---|---|---|---|
| Start Up Order | D10, A21, B31, C3 | Use methods such as hashing (i.e., sha, snerfu, md2, md4, md5, etc.) to identify | Algorithms to compare actual state to the signed state and detect differences | Provide alerts to systems and to operators for detections. Record all relevant data |
| Priority Sub Systems | B, A21, C | | | |
| Change in State Order | C1, D11, B32, A22 | | | |
| Shut Down Order | C3, B31, A21, D10 | | | |
| Fail Safe Modes Order | C3, A21, D10 | | | |
| Other Data Patterns Order | A21 + C2, B32 + 21 + C1 | | | |

Figure 6:
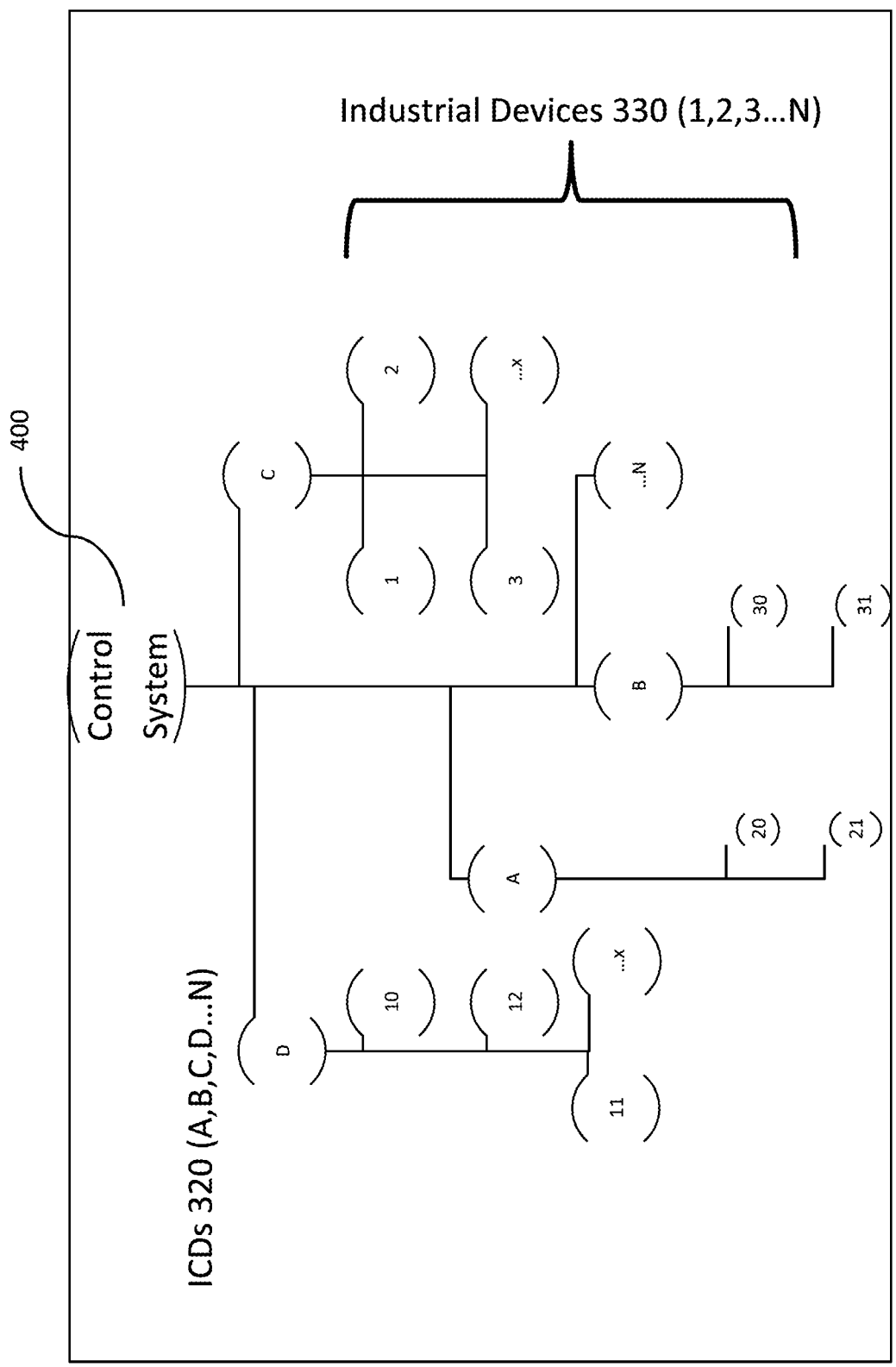
FIG. 6 shows an exemplary configuration of devices in an OT system.

The Table shows exemplary patterns of normal states and behaviors for the exemplary OT system shown in FIG. 6. Referring to the Table, there are normal patterns within the control system that can be discerned or learned. These normal patterns represent normal behavior within the system. This may include a learned characterization of how the devices within the OT system are (1) brought on line in a production process, (2) how they react in normal dynamic changes to the system processes, (3) how they are taken down safely and in what order, (4) how they operate in failsafe modes, and (5) how they operate in other known system states. These normal patterns reflect the designed states of the system under normal operating processes and they are engineered into the control system architecture in the design process.

The security device 100 can discern normal activity patterns by using the information collected by one or more security devices 100, and using well-known machine learning algorithms such as hidden Marcov models that analyze the collected system data over time to identify hidden states found within that data. When assigned to Level 0, 1, and 2, data collected by the security device 100 or collected by the security console 520 over a period of time, the resulting Markov models can aid in defining the normal operating states hidden within the data provided by monitoring of the control system and provide an example of a basis for state comparison—normal versus current state—that, in turn, allows for identification of anomalous behaviors.

Once those normal states are derived by the security device platform that is constantly monitoring data in the control system, the resulting catalog of states can be securely stored using methods, such as signatures stored using hash algorithms, such as SHA, MD2, MD4, MD5, etc. These states cannot be learned unless the security device 100 was collecting data from Levels 0, 1, and 2 within the OT system.

The security device 100 can detect deviations from normal state that cause the control system to either not operate correctly or possibly to fail catastrophically using the signatures and comparison against the monitored system state. These incidents can be initiated by either system failures or by cyber attacks. By collecting, storing and analyzing these normal patterns of process functions, the security device 100 can use this information to detect anomalies—when these patterns are changed. This data provides new insight into classifying system failures into general system faults or cyber attack incidents that has not been previously possible without this method of data extraction. This analysis can happen in both real time and in post event forensic analyses.

The security device 100 and the security console 520 can provide integration of information from maintenance schedules and from lifecycle curves of mechanical devices operating within the CS to aid in anomaly detection where the failure occurs different from the expected lifecycle curve. This information also can aid in addressing issues of false detections within incident detection algorithms used to evaluate the state in the control system.

The security device 100 and the security console 520 can access storage on the gold standard storage to gather information on maintenance and component lifecycle curves for use in comparative analyses performed by the security device 100. The security devices 100 can compare the detected change in system state to the planned maintenance schedules and the known lifecycle curves for the electrical components within the OT system, and use that information to adjust the sensitivity of the algorithms used to alert operators based on those changes in system state.

The security device 100 provides integration of information from alarm conditions generated within the OT system to aid in the detection of anomalous system state and to reduce the incidents of false detections.

The security device 100 and the security console 520 can use information gathered from Levels 1 and 2 in the OT system for use in comparative analyses performed by the security device platform. The platform security devices can compare the alarm conditions within the OT system to either changes in state for the protected system or the lack of detected change in system state of the protected system and use that information to alert operators of possible false alarms within the OT system or that information can be used to adjust the sensitivity of the algorithms normally used to alert operators to reduce false alarms with the security architecture.

The security device 100 can allow for parameter and configuration assurance of devices at Level 1 in the Purdue ICS Reference Architecture. Field device (industrial device) configurations, including firmware versions, ladder logic (used to control the production processes) and data parameters (used to adjust how the ladder logic processes the information in the control system), validate that the logic, system parameters, or firmware has not changed.

The security device 100 and the security console 520 regularly monitor the parameter values in use in the OT system and compare them to pre-determined values stored in the gold standard storage or for changes that are from authenticated and authorized sources within the OT system. If any differences are detected, checks are made to determine the source and validity of the change, for example, using key logging HW/SW to monitor the inputs made at an operator control station to trace back the change to a valid action taken by an operator, comparison against changes in configuration that match those stored in the gold standard storage, or those that originate from network locations that have authenticated access to the OT control. When no valid source for a parameter change can be detected, the security device 100 and the security console 520 can detect the anomalous system behavior and provide an alert.

The security device 100 performs data validation/consistency to ensure that control system data presented to operators for use in system control can be trusted and has not been altered by a cyber attack.

The security device 100 and the security console 520 can use the laws of physics to provide consistency checking with collected cyber information to validate the system data being presented to the operators. Mechanical devices within the OT network are meant to interact with the physical world, which in turn limits the set of functions such devices can achieve to those that obey these laws. These limits provide an opportunity for the security platform to detect anomalous, as well as impossible, system behavior.

Figure 7:
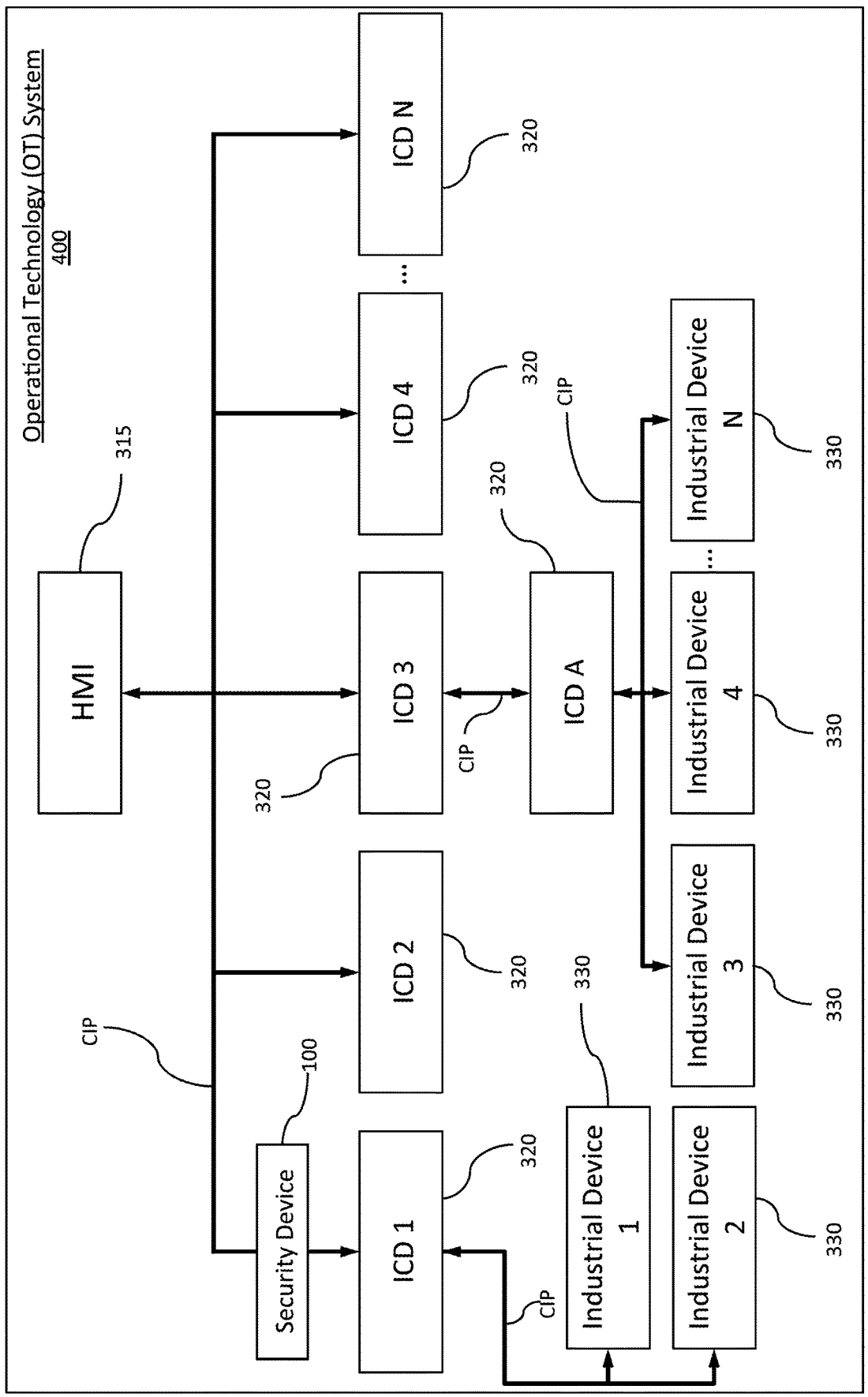
FIG. 7 shows the exemplary OT system similar to FIG. 3, but including a security device.

FIG. 7 shows a security device 100 placed in line between a Level 2 device, such as the HMI, and a Level 1 device, such as the ICD 320 in the OT system. In this configuration, the security device 100 provides security protections to a single ICD 320 at Level 1. All OT network traffic is forced through the security device 100 providing a computing platform to support cyber security protections. FIGS. 3 and 7-9 label the communication channel (e.g., communication connection or transmission lines) as using common industrial protocol CIP, as an example. The information can flow over different media and protocols, including Internet Protocols (IP) such as Telnet, FTP, http, or Industrial Protocols, such as the CIP, Modbus, OPC or Profibus, running over interfaces such as Ethernet, Serial, or USB.

Figure 8:
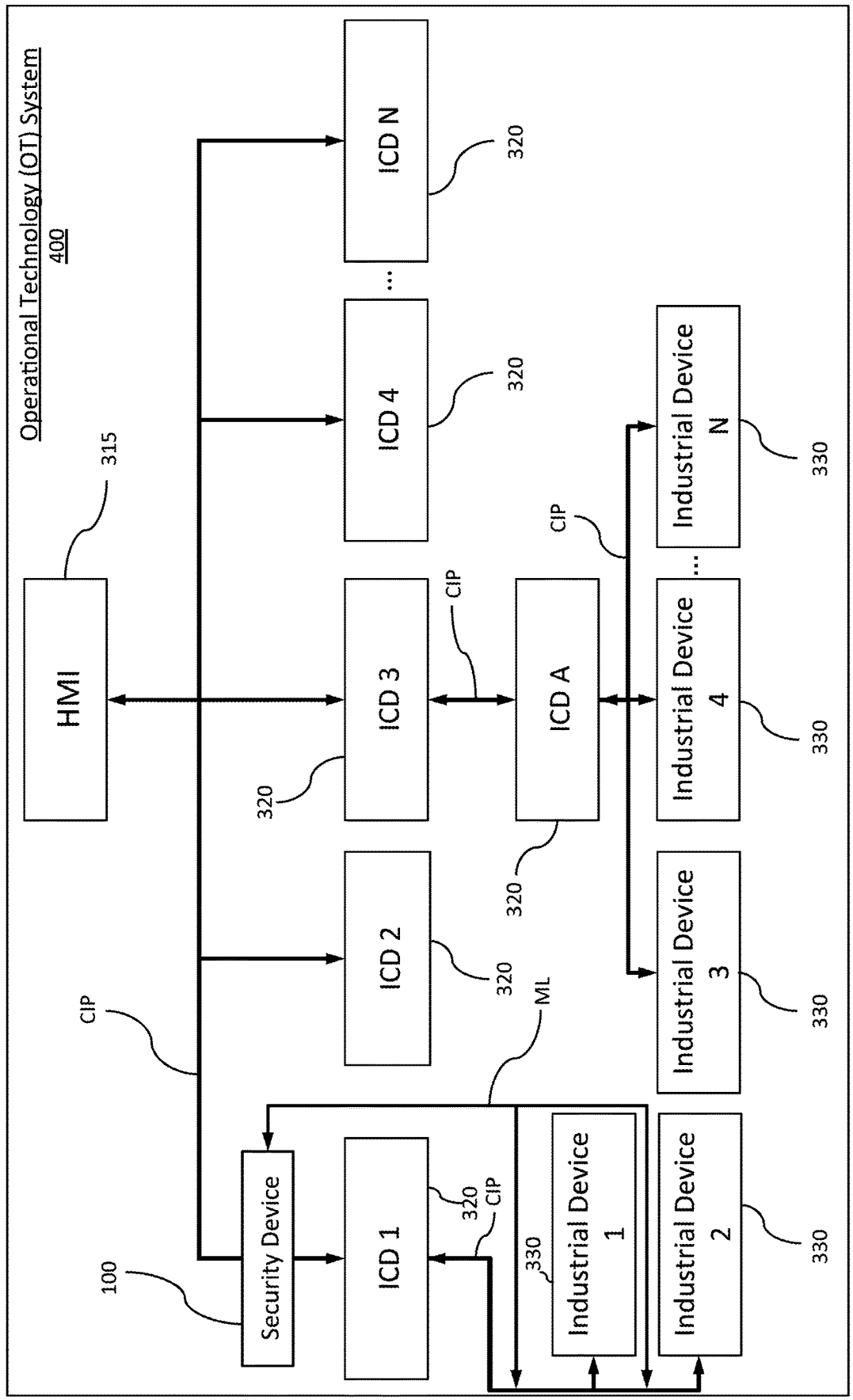
FIG. 8 shows another exemplary OT system similar to FIG. 7 but including a monitoring capability.

FIG. 8 shows another embodiment, which is similar to the embodiment of FIG. 7, where the security device 100 is placed between Levels 1 and 2 with additional sensor and signal taps placed between Levels 0 and 1, for example, in the Purdue ICS reference model 300. In this embodiment, the security device 100 includes the capability to gather and protect information transferred to and from a ICD 320 at Level 1, the industrial devices 330 at Level 0, and the HMI at Level 2, for example, in the Purdue ICS reference model 300. The security device 100 also collects data and information from the electronic signals between Levels 0 and 1. These electronic signals are typically either continuous analog signals or discreet digital signals. For example, a typical analog device or sensor will send or receive 4-20 mA analog signals to a control device 320. The security device 100 can provide added security protections to the Level 1 control device 320 by providing a computing platform for comparative analysis and for secured data storage.

Figure 9:
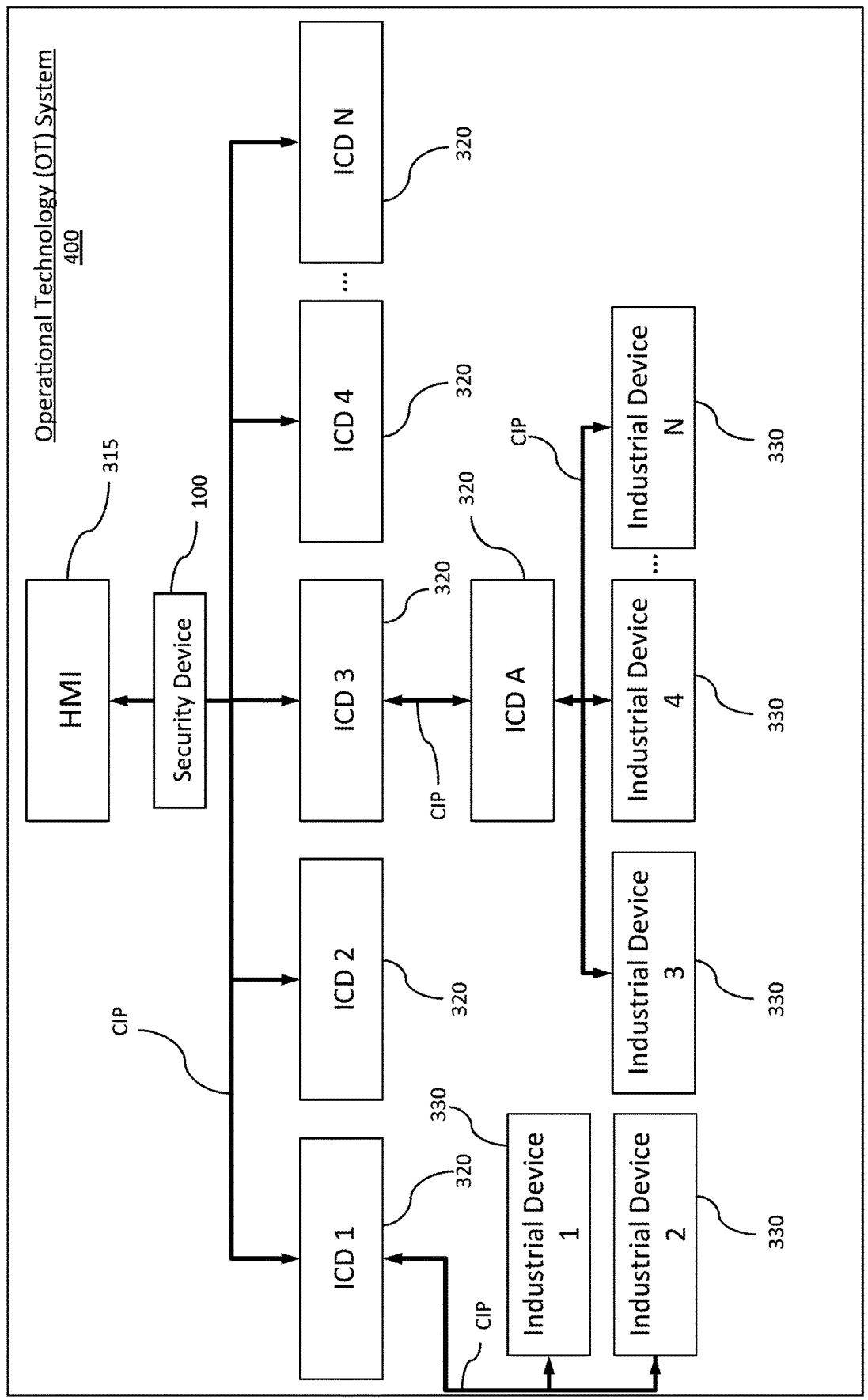
FIG. 9 shows the exemplary OT system similar to FIG. 7, but having the security device interposed at a different location.

FIG. 9 shows another embodiment similar to the embodiment of FIG. 7, but having the security device 100 positioned closer to the HMI 315. In this embodiment, a single security device 100 is placed between Levels 1 and 2 to protect a plurality of ICDs 320. The security device 100 includes a plurality of communication interfaces 152, one to connect with the HMI 315, and each of others to connect to one of the ICDs 320 in the OT system.

Figure 10:
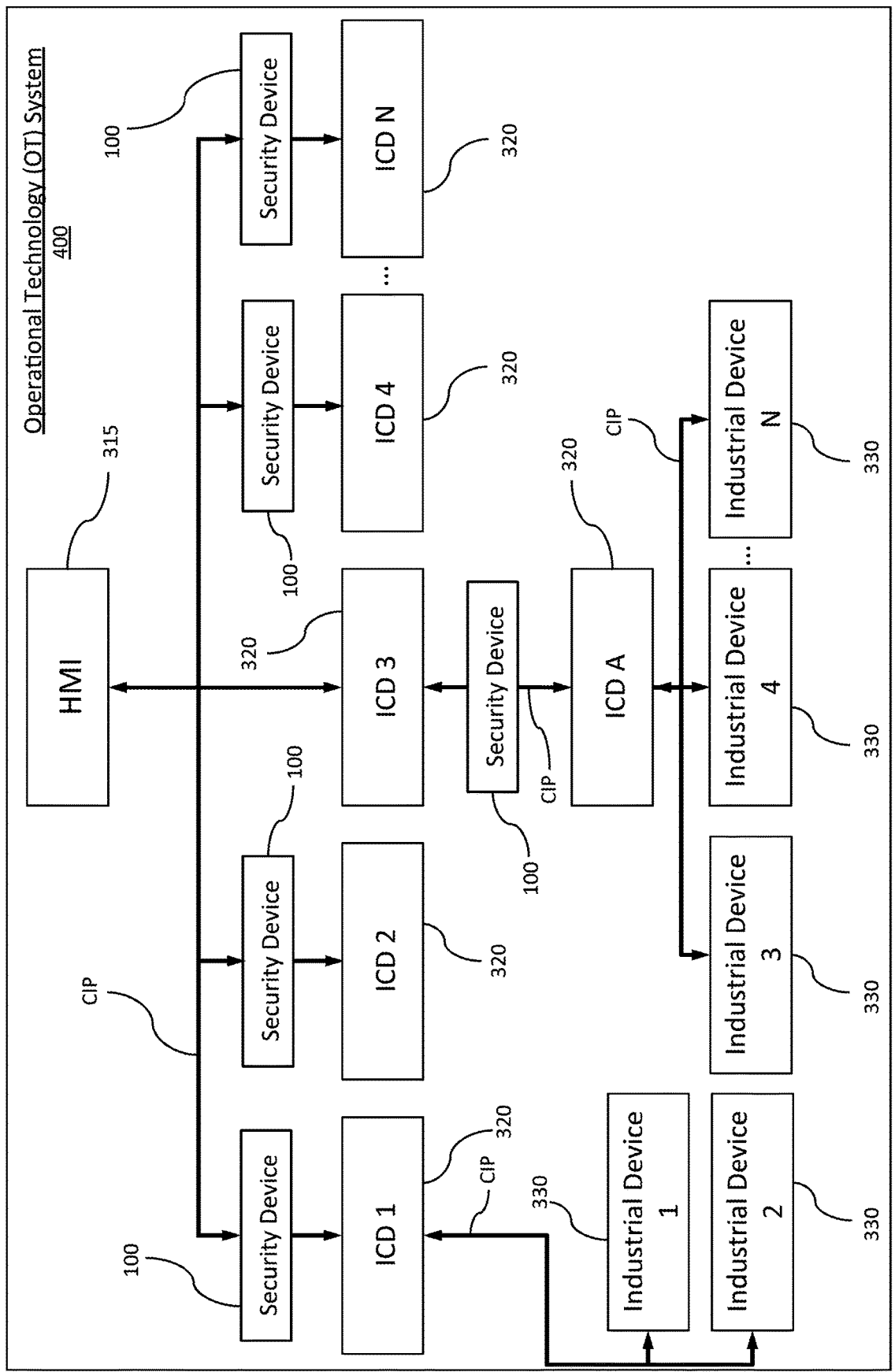
FIG. 10 shows another exemplary OT system similar to FIG. 7, but having a plurality of security devices.

FIG. 10 shows another embodiment where a plurality of security devices 100 are placed between Levels 1 and 2, for example, in the Purdue ICS reference model 300. In this embodiment, each of the plurality of security devices 100 provides the capability to gather and protect information transferred to and from each of a plurality of control devices 320 at Level 1 to the HMI at Level 2 in the Purdue Reference Model 300.

Figure 11:
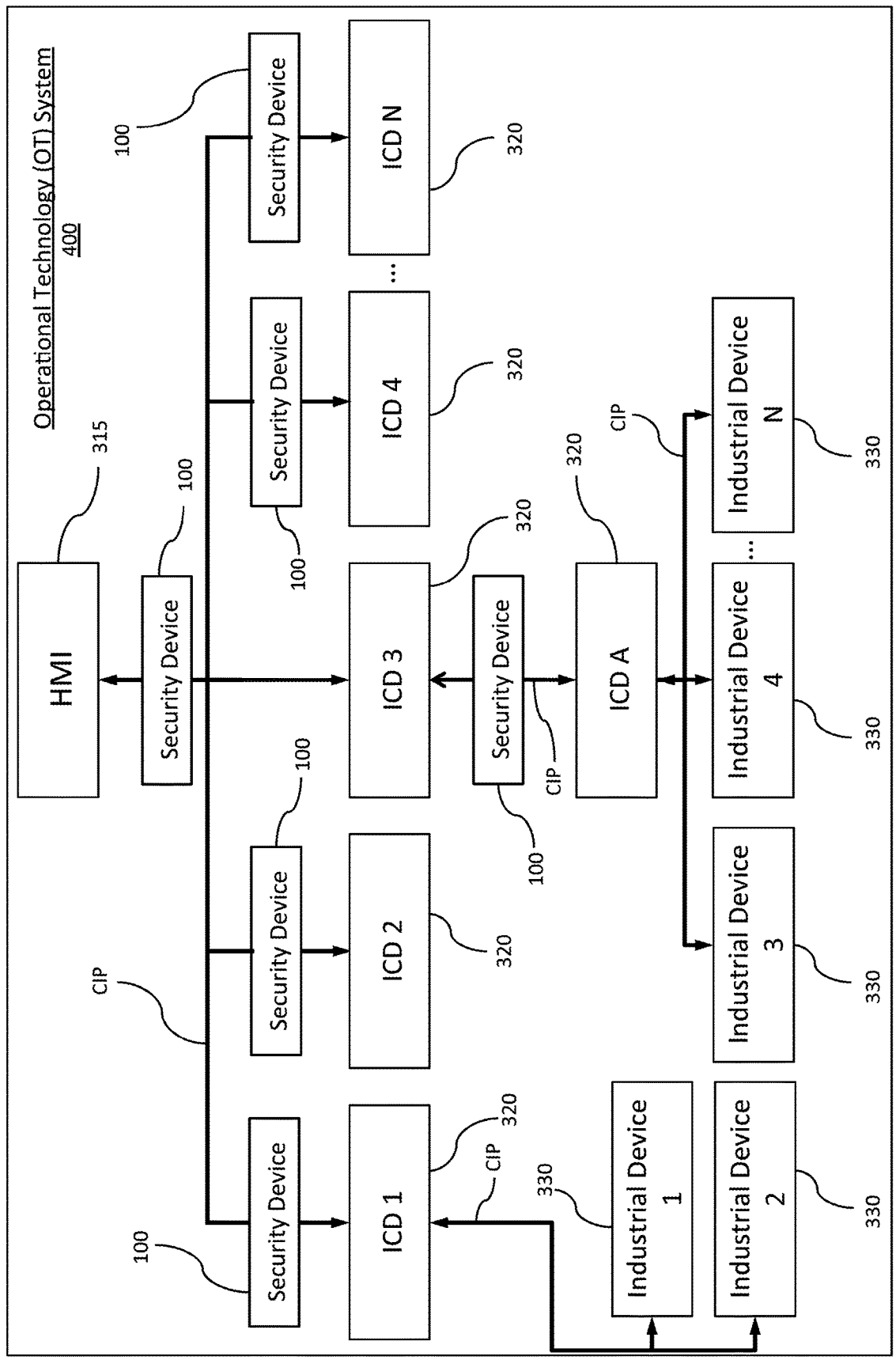
FIG. 11 shows another exemplary OT system similar to FIG. 10, but including an additional security device communicating with other security devices.

FIG. 11 shows another embodiment, which is similar to the embodiment of FIG. 10, but including another security device 100 upstream of other security devices 100. A plurality of security devices thus can be placed between a single ICD 320 and the HMI, as shown in FIG. 11. Here, one security device 100 can be associated more closely with the HMI, and the other security devices 100 can each be associated more closely with the respective connected ICDs 320. The security device 100 placed closer to the HMI can be communicably or operatively connected to the other security devices 100 and provides the capability to gather and protect information transferred to and from the plurality of control devices 320 at Level 1 and the HMI at Level 2, for example, in the Purdue Reference Model 300.

FIG. 12 shows another embodiment where at least one security device 100 is provided in an electrical distribution system, protecting an industrial relay control device 1200 that controls an industrial device 330, such as an electrical breaker. The electrical distribution system can also include a 4-20 mA sensor 161, which can provided inside the security device or externally provided, that senses the control signal flowing between the industrial relay control device 1200 and the electrical industrial device 330. The signal through the monitoring line ML, which is separate from the CIP line, can be analog or digital. The security device 100 can provide cyber security protections and monitoring and detection capabilities for electrical relay devices and the associated operator HMI in the OT system associated with the electrical distribution system.

The present security device 100 can provide a layer of cyber protection to an industrial electrical relay control device 1200 that inherently has very limited cyber security protections. The electrical relay control device 1200 is utilized in many electrical distribution systems to provide protections for over and under voltage and current circumstances within the electrical grid. For example, the electrical relay control device 1200 can quickly send signals to downstream breakers 330 or to other electrical relay control devices 1200 to shut off power to protect the industrial devices that are connected to the control system to prevent damage. The relay system can be implemented in a hierarchy of electrical relay control devices 1200. The relay system operator is provided with a HMI that provides status reporting for the electrical relay control device 1200. The interface allows the operator to control the parameters and settings for the electrical relay control device 1200 and also to send commands to the electrical relay control device 1200 to change its operating state.

The security device 100 can also include a device console 520 to provide information on the status of the security device, detected threats, and operational information. The security device 100 can be placed in-line between the HMI and the electrical relay control device 1200. The security device 100 can be embodied in a single board computer (SBC) that hosts the application logic and includes the communication interfaces 152 with various devices in the OT system. For example, Ethernet connections can be utilized by the security device to connect to the Ethernet interface on the electrical relay control device 1200 and an available Ethernet port on a network switch in the OT network, which either hosts the HMI, or connects to another computing device 100 that hosts the HMI. This places the security device in series between the Level 2 computing devices in the OT system, such as the HMI, and the Level 1 electrical relay control device 1220 being protected.

The security device also can be used to tap directly into the 4-20 mA sensor 161 used for controlling devices and reading sensor information from the control system using a monitoring line (ML). The sensor 161 can, for example, monitor a current through a wire that is used to validate the information that is being sent to the HMI by the electrical relay control device 1200. The security device 100 provides interfaces for a variety of protocols including GPIO, I2C, UART and USB. The sensor 161 can support data consistency for cyber security and forensic analysis. This data can be used for real time analysis but can also be stored in secured storage, such as gold standard storage, for subsequent analysis. The data can also be transmitted securely to other tools for forensic analysis.

The signals at Levels 0 and 1 can be a physical signal such an electrical current, such as between 4 mA and 20 mA, or between −10 mA and +10 mA, or a voltage. The physical signal can also be a binary signal having, for example, a first state associated with a 24 VDC level and a second state associated with a 0 VDC level. The security device can be operatively coupled with one or more control devices 320 within the OT system to form a cyber protection network associated with a protected control system. The OT network can comprise a Transport Control Protocol/Internet Protocol (TCP/IP) communication channel and can encrypt information used in the OT system, particularly within the higher Levels 2-4. The TCP/IP communication channel can be a Transport Layer Security (TLS), Information Processing Security (IPSEC), or Virtual Private Network (VPN) tunnel.

Figure 13:
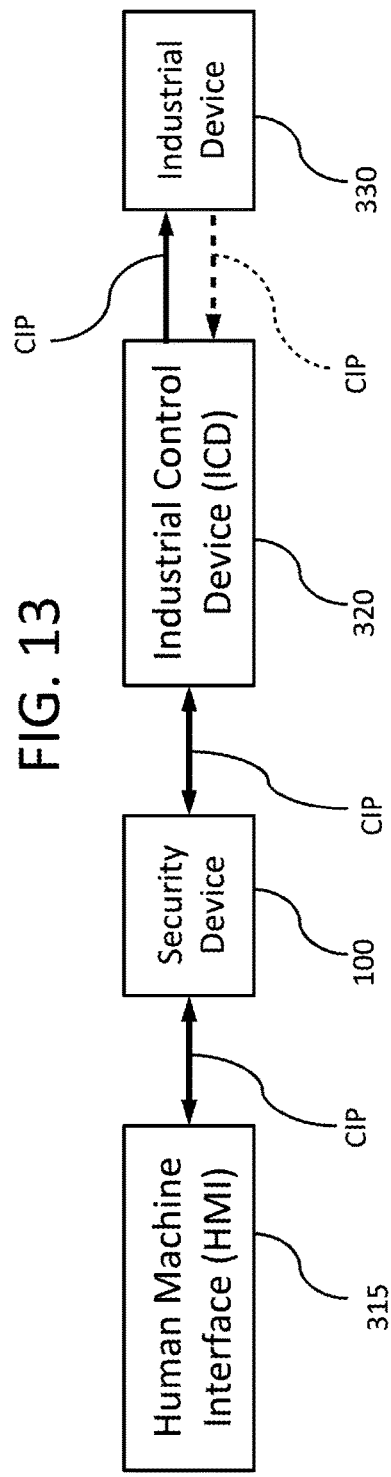
FIG. 13 shows another exemplary OT system including a security device.

FIG. 13 shows another embodiment of a control system having a security device 100. The security device 100 here can include a first communication interface 152A (see FIG. 5B) to connect to the HMI and a second communication interface 152B to connect to the industrial control device 320. The ICD 320 can control one or more industrial devices 330.

Figure 14:
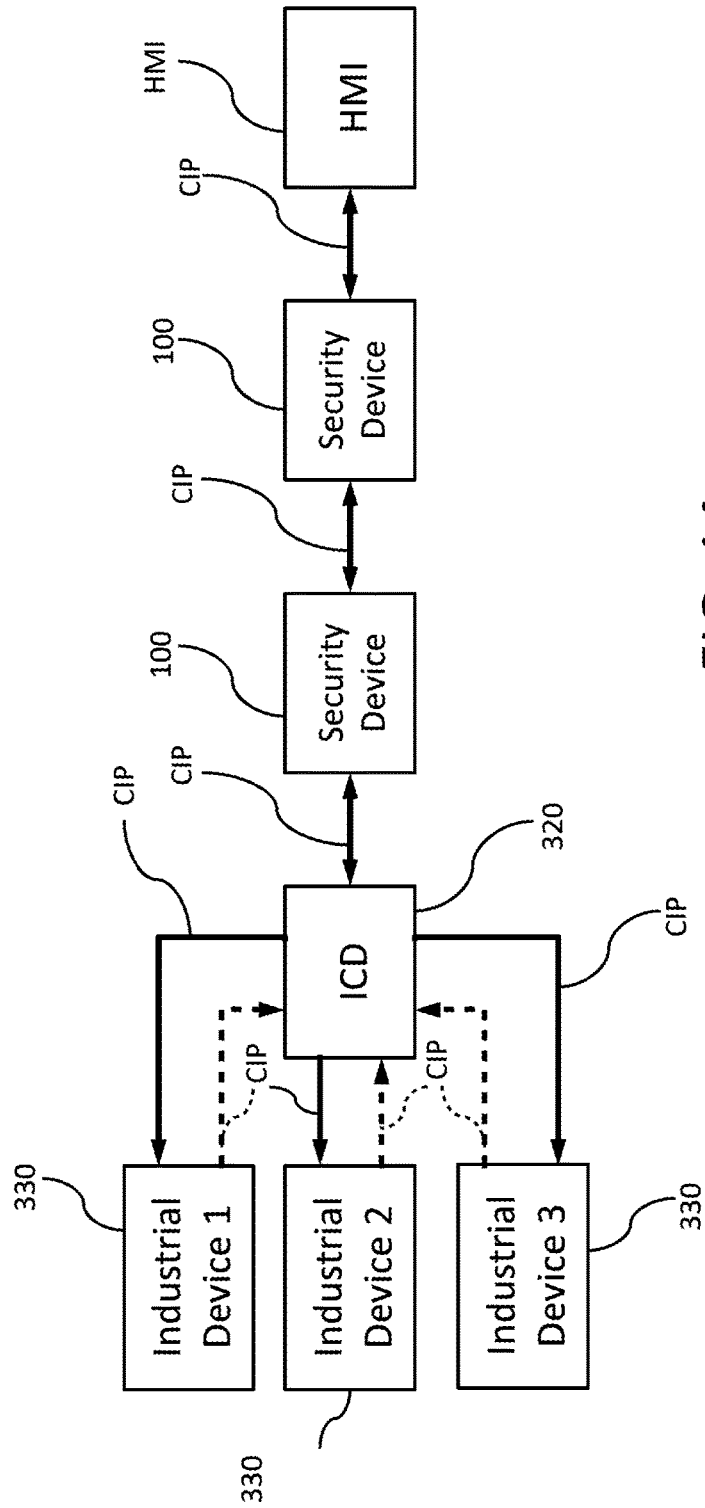
FIG. 14 shows another exemplary OT system including multiple security devices.

FIG. 14 shows another embodiment of a control system having a plurality of security devices 100 communicating with each other. Each security device 100 includes first and second communication interfaces 152A, 152B. One security device 100 is disposed closer to the HMI and connects to the HMI 315 using one of the communication interfaces 152A, 152B and the other security is connected to one of communication interfaces 152A, 152B via the other of the communication interfaces 152A, 152B. The other security device 100 connects to the ICD 320 using the other of the communication interfaces 152A, 152B. The ICD 320 controls at least one industrial device 330. In this embodiment, the HMI 315 can be located remote from the ICD 320, and connected using a communication channel CIP, which is susceptible to cyber-attack. By providing a security device 100 at each of the locations of the ICD 320 and HMI 315, greater security against compromised communication channels can be realized.

Figure 15:
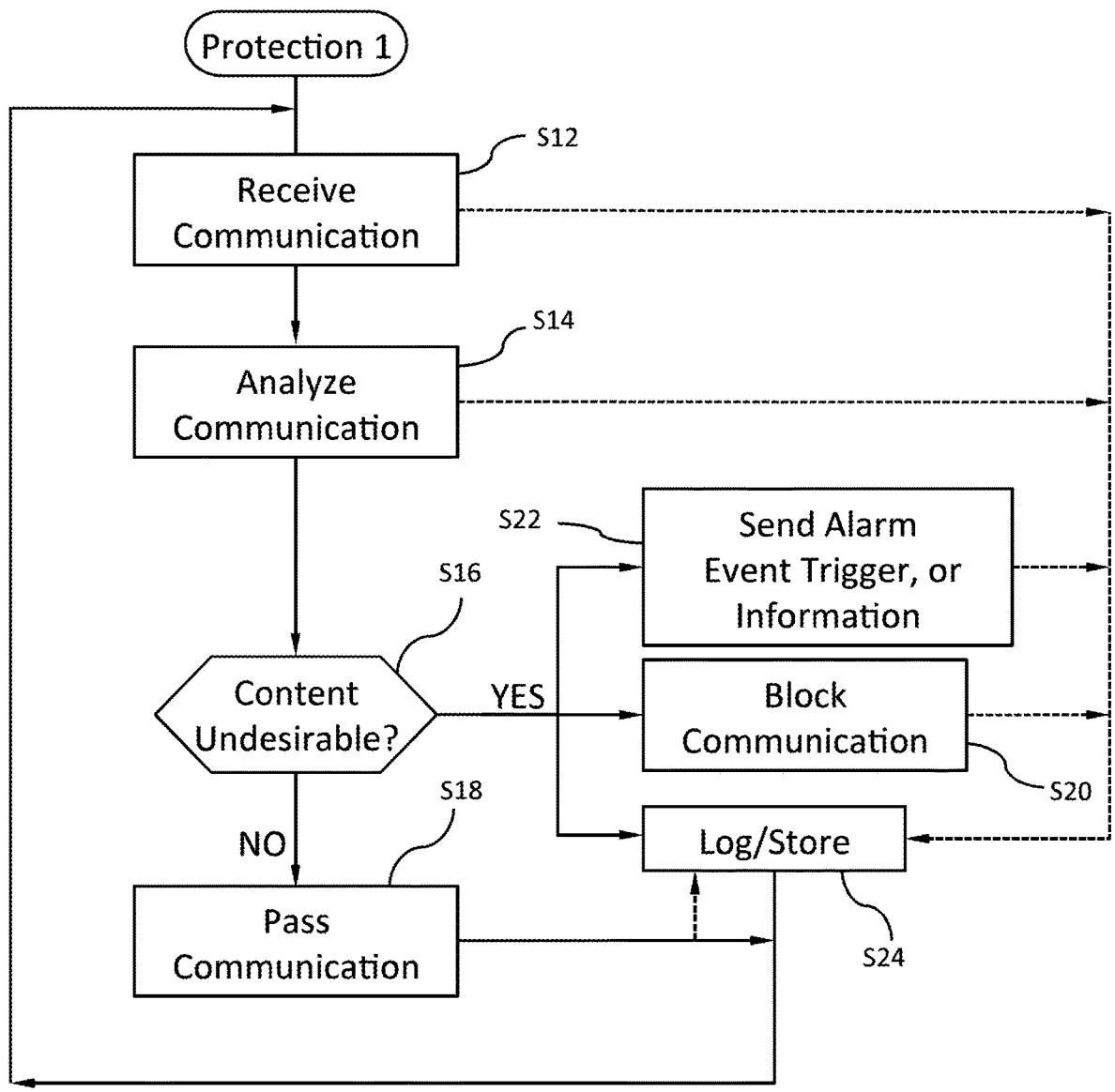
FIG. 15 shows an operational diagram, namely a flowchart of an exemplary method of protecting an OT system including a security device.

FIG. 15 shows a flowchart or algorithm for protecting an OT system. The cyber security method can be implemented as software or instructions executed by the security device 100. The security device receives or intercepts communication from the OT network in S12 via one of the communication interfaces 152. Such communication can be received from the HMI 315, the ICD 320, or the industrial device 330, for example. The communication is analyzed in S14 to determine whether the communication includes undesirable content, such as an undesirable or inappropriate command. The analysis can be performed using one or more base security functions 510 or control system specific security functions 515 described earlier. The security device 100 determines whether the received control communication contains an undesirable content, namely undesirable control command, in S16. This determination can be based on one or more control system specific functions 515, such as those described above for identifying anomalous behavior.

If the security device 100 determines that the content of the communication is appropriate or acceptable (NO in S16), namely does not determine that the received control communication contains an undesirable control command, the communication is allowed to pass through in S18 to the intended recipient of the communication within the OT network. In this regard, the source of the communication can be the HMI 315 or one of the ICDs 320 and the recipient of the communication can be a different ICD 320 or HMI 315. Once the communication has been deemed appropriate and passed through, the security device waits to receive another communication from a device in the OT system (i.e., loops back to S12).

If the security device 100 determines that the content is in inappropriate or unacceptable (YES in S16), namely determines that the received control communication contains an undesirable control command, the security device can take many actions in S20, S22, and S24. In S20, the communication is blocked so that it is not passed through to the intended recipient. In S22, an alarm, event trigger, or other information can be generated and sent to a user or operator, for example, at HMI 315 or security console 520, for further action. In S24, information associated with the undesirable command is logged or stored for further analysis.

The logging/storing step or task S24 also can be optionally performed after each of S12, S14, S18, S20, and S22, to store a comprehensive record of the operations of the OT system to aid in future forensic analysis or other processes. The particular data or information that is stored can vary as needed to meet various needs, which includes providing base and control system specific security functions, providing a data source for in-depth forensic analysis, and to recreate system events related to cyber security for the protected control system 400 or security device 101. The user can also configure and change the type of information collected and stored in the logging/storing step/task S24.

Figure 16:
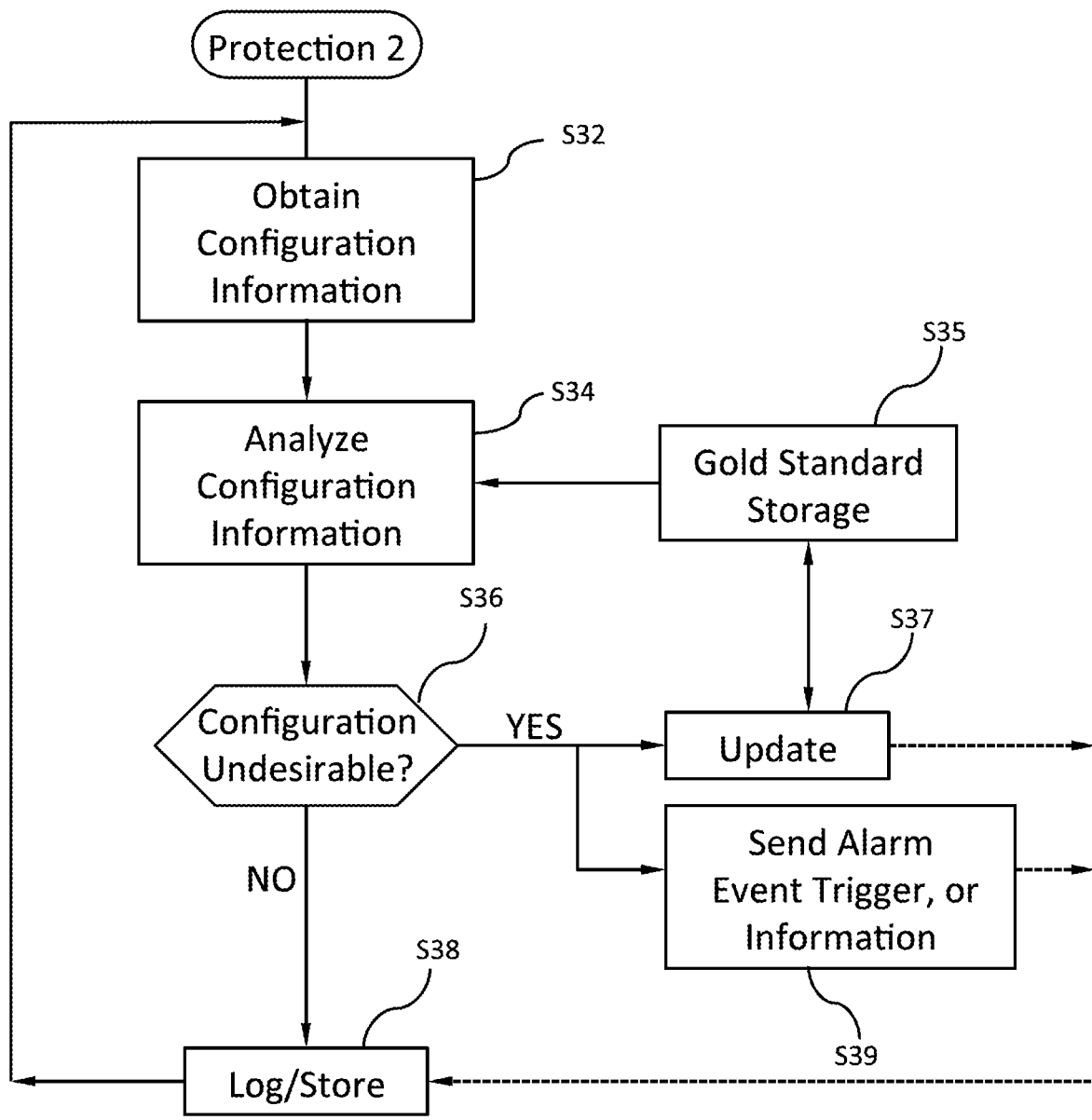
FIG. 16 shows an operational diagram, namely a flowchart of another exemplary method of protecting an OT system including a security device.

FIG. 16 shows a flowchart or algorithm for protecting an OT system. Specifically, FIG. 16 shows the algorithm for providing configuration assurance for the OT system. The security device obtains configuration information from the OT system in S32. The configuration information can include one or more design parameters for the OT system. The design parameters can include the number, location, and other associated information for each component, such as HMI 315, ICD 320, or industrial device 330, included in the OT system. The configuration information also can include the number of security devices 100 to be deployed in the OT system, including each security device's touch point, access point, or connection information into the protected control system, and the location of each security device 100 (e.g., local or remote). Furthermore, the number and type of sensors 161 can be determined, and permission controls for informing regarding detected events can be specified. The configuration information also can include parameters for various base security functions 510 and control system specific security functions 515 provided by the security device 100.

The configuration information can include information associated with normal operative state or behavior of the control system 400. Algorithms for normalizing sensor data streams and the interfaces for corrective actions also can be defined. In S34, the security device analyzes the configuration information. In S34, the analysis includes comparing the obtained configuration information with a reference source in S35.

Specifically, the security device can retrieve gold standard security patterns, forensics, and corrective action information stored in a storage device in S35 and compares the received configuration information obtained from the OT network in S34. The security device determines in S36 whether the obtained configuration information contains an undesirable configuration information based at least upon a comparison with the gold standard configuration information.

If the security device 100 determines that the configuration information is undesirable (YES in S36), an alarm or event can be triggered in S39. Information regarding the undesirable configuration can be sent to an HMI 315 or security console 520 for further review and action. Also the gold standard storage can be updated to reflect information associated with detected undesirable configurations in S37.

If the security device 100 determines that the configuration information is acceptable (i.e., does not contain undesirable configuration) (NO in S36), the configuration information can be logged or stored for further analysis in S38.

The logging/storing step or task S38 also can be optionally performed after each of S37 and S39, again to store a comprehensive record of the operations of the OT system to aid in future forensic analysis or other processes, similarly as S24. Specifically, data associated with the undesirable configuration, and any actions or updates performed can provide useful information. Again, the user can also configure and change the type of information collected and stored in the logging/storing step/task S38.

Figure 17:
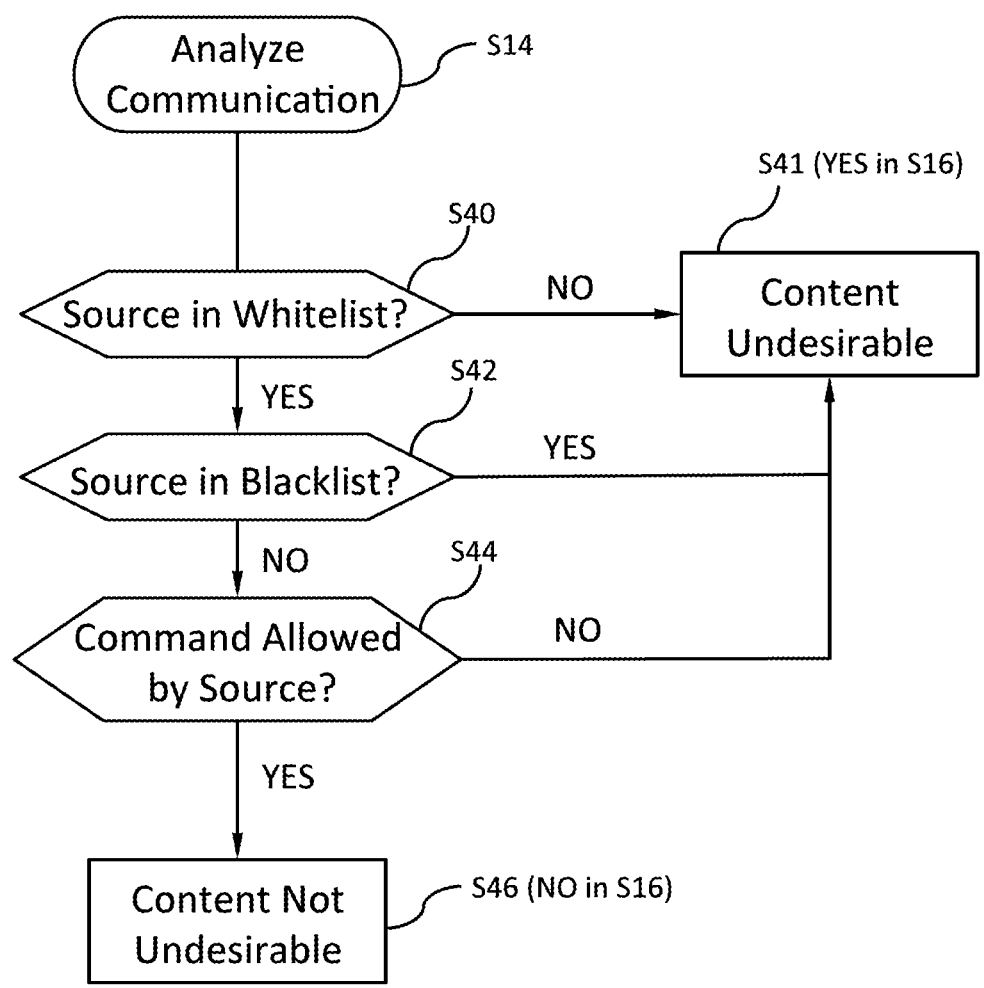
FIG. 17 shows an operational diagram, namely a flowchart of an exemplary method of analyzing communication in FIG. 15 to protect an OT system including a security device.

FIG. 17 shows a flowchart or algorithm for the analyzing step/task S14 in FIG. 15 for validating network traffic in an OT system. The security device 100 can monitor the communications within the network and check the network source to determine whether the communication received in S12 is valid. In S40, the source of the received communication is checked against a whitelist stored in secured storage 157 or memory 151 to determine whether the communication is emanating from a validated network source. If the received communication is not determined to be from a validated network source in the whitelist (NO in S40), the communication is deemed undesirable in S41, which corresponds to YES in S16 (FIG. 15). If the communication source is deemed to be stored in the whitelist (YES in S40), then an additional validation check can be performed in S42 to determine whether the source of the communication is emanating from a source in a blacklist stored in secured storage 157 or memory 151. If the source of the communication is determined to be present in the blacklist (YES in S42), the communication is deemed undesirable in S41 (corresponding to YES in S16). If the source of the communication is determined to be not present in the blacklist (NO in S42), then the communication is checked in S44 to determine whether the content of the network message contains commands that are valid for the network source of the message. If the content of the communication, such as a control command, is deemed to be invalid (NO in S44), the communication is deemed undesirable in S41 (corresponding to YES in S16). If the communication is determined to includes a valid command for the network source (YES in S44), the communication is deemed not undesirable in S46 (corresponding to NO in S16).

Similar algorithm can be used in the analyzing step/task S34.

In another embodiment of the invention, the present development provides a new layer of cyber protections for connected devices that do not have native security functionality designed into them. The protections are focused on the physical devices within IOT networks. Specifically, protections can be embodied in a security device 100 that monitors network traffic within the IOT network, such as that between an HMI 615 and connected devices 620. The security device can detect and block undesirable control system commands leading to anomalous system behavior.

The connected devices that make up an IOT system are designed with functionality in mind, not cyber security. Embodiments of the present invention provide methods, devices, and systems for protecting the cyber functions of IOT devices by applying the cyber security techniques discussed previously with respect to OT networks to IOT networks. This is accomplished by introducing software and hardware components into the IOT system and the surrounding communication ecosystem to continuously monitor the functions of the IOT devices and communications, detect anomalous behaviors within or around the connected device, provide alerts of potential incorrect or corrupted behaviors, provide protections for functions within and around the IOT device, create secure logs of IOT monitored data, and provide corrective actions to keep IOT devices functional in the face of a detected cyber threat.

FIG. 18 shows a security device 100 placed in line between a control application such as the HMI 615 and connected devices 620 in the IOT system. In this exemplary configuration, the security device 100 provides security protections to the connected devices 620 by forcing all IOT network traffic through the security device 100 providing a computing platform to support cyber security protections. The operation of the security device 100 in the IOT network is similar to the operation of the security device 100 in the OT network discussed previously and is omitted here for brevity. It should be noted that the methods and systems discussed previously for OT networks work similarly for OT networks by providing security to connected devices 620 similar to providing security to industrial devices 320.

The security device 100 collects digital and analog information both internal and external to the connected device 620 that can be used to correlate and detect abnormal and anomalous IOT system behaviors for that device or surrounding devices. For example, in one embodiment, information from multiple sensors or connected devices can be aggregated to give a more complete view of the system state and identify anomalous conditions indicating a possible cyber breach—or a possible system malfunction. Consider, for example, an IOT system collecting information about the speed, direction, status of the brakes, position of the throttle, information on objects detected in a vehicle's path. Different connected devices can collect and provide information on the same property. This information flows across a bus (such as the CAN bus) of an automobile (the main communications network for most vehicles). The security device 100 can continuously monitor and detect anomalous behaviors of a function on the automobile. For example, the vehicle reporting it is braking in response to an object in its path when the vehicle's camera system is not reporting an detected objects. Pushing the collection and analysis into the security device 100 enables near real time actual evaluation of system state vs. reported state; thus, enabling protections for system functionality within the device.

The methods of protecting an IOT system are similar to the methods of protecting an OT network, shown in FIGS. 15-17. For example, in one embodiment of the invention, the method includes an intercepting step, a first determining step, a passing step, and a blocking step. The intercepting step intercepts a communication between a controller and a connected device over an IOT network (S12), the communication including a control communication for controlling the connected device. The first determining step analyzes the communication to determine whether the received control communication contains an undesirable control command (S14). If the received control communication does not contain an undesirable control command (NO in S16), the received control communication is passed to the connected device in the passing step (S18).

If the first determining step detects that the received control communication contains an undesirable control command then a blocking step (S20) of blocking the received control communication is performed. The blocking step may also include a correcting step that inserts corrective communication into the connected devices or into the communications to put the device or communication into a different state when the first determining step detects that the received control communication contains an undesirable control command.

Various embodiments described herein address the drawbacks of a conventional OT system or network, namely by providing a security device or a security platform that can be used to augment existing control systems and provide a new level of protection to these vulnerable devices. The security device adds base security functionality into the OT system devices and creates a novel and inventive set of protections that are designed specifically to address security vulnerabilities within the control system.

Given the present disclosure, one versed in the art would appreciate that there can be other embodiments and modifications within the scope and spirit of the present disclosure. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method of protecting an Internet of things (IOT) system having connected hardware equipment, including at least a security device having a communication interface, a memory, and a processor electrically connected to the memory, the processor configured to implement instructions stored in the memory to execute steps of the method, the method comprising:
- an intercepting step of intercepting a communication between a controller and a connected device over an IOT network, the communication including a control communication for controlling the connected device;
- a first determining step of determining whether the received control communication contains an undesirable control command;
- a passing step of passing the received control communication to the connected device when the first determining step does not determine that the received control communication contains an undesirable control command;
- a blocking step of blocking the received control communication to the connected device when the first determining step detects that the received control communication contains an undesirable control command; and
- a logging step of storing, in a storage device, forensic data for the connected device when the first determining step determines that the received control communication contains an undesirable control command.

2. The method according to claim 1, further comprising:
an analyzing step of analyzing the received control communication,
wherein the first determining step determines that the received control communication contains an undesirable control command based on at least one of whether the control communication is received from a validated network source or the content of the control communication.

3. A protection system for an Internet of things (IOT) system having a connected device, the protection system comprising:
- an input/output (I/O) interface that communicates with a source that provides control communication; and
- a security device that intercepts a communication between the connected device and the I/O interface over an IOT network,
- wherein the security device includes a memory and a processor electrically connected to the memory and configured to implement instructions stored in the memory to execute:
  - a receiving task that receives an intercepted control communication from the I/O interface over the IOT network, the control communication including at least one control command to be sent to the connected device;
  - a determining task that determines whether the received control communication contains an undesirable control command;
  - a passing task that passes the received control communication to the connected device when the determining task does not determine that the received control communication contains an undesirable control command;
  - a blocking task that blocks the received communication to the connected device when the determining task determines that the received control communication contains an undesirable control command; and
  - a logging task that stores, in a storage device, forensic data for the connected device when the determining task determines that the received control communication contains an undesirable control command.

4. A method of protecting an Internet of things (IOT) system having connected hardware equipment, including at least a security device having a communication interface configured to communicate with a controller over an IOT network to receive a control communication for a connected device, the method comprising:
- a learning step of learning behavior patterns, the behavior patterns including normal behavior patterns of system processes operating in the IOT system and the connected hardware equipment in the IOT system and anomalous system behaviors and deviations in system state that indicate potential cyber incidents or general system failures, and differentiating therebetween;
- a receiving step of receiving control communication from the controller over the IOT network, the control communication including at least one control command to be sent to the connected device;
- a determining step of determining whether the received control communication contains an undesirable control command based at least on the learned behavior patterns;
- a passing step of passing the received control communication to the connected device when the first determining step does not determine that the received control communication contains an undesirable control command; and
- a blocking step of blocking the received control communication to the connected device when the first determining step detects that the received control communication contains an undesirable control command.

5. The method according to claim 4 wherein the learning step uses artificial intelligence (AI) hosted algorithms to detect inconsistent system state information.

6. A method of protecting an Internet of things (IOT) system having connected hardware equipment, including at least a security device having a communication interface configured to communicate with a controller over an IOT network to receive a control communication for a connected device, the method comprising:
- a receiving step of receiving control communication from the controller over the IOT network, the control communication including at least one control command to be sent to the connected device;
- a maintenance step of providing integration of information from maintenance schedules, alarm conditions in the IOT system, and from lifecycle curves of connected hardware equipment operating within the IOT system to aid in anomaly detection where the failure occurs different from the expected lifecycle curve, wherein the information aids in addressing issues of false detections within incident detection algorithms used to evaluate the state in the IOT system;
- a determining step of determining, based at least on the integrated information provided by the maintenance step, whether the received control communication contains an undesirable control command;
- a passing step of passing the received control communication to the connected device when the first determining step does not determine that the received control communication contains an undesirable control command; and
- a blocking step of blocking the received control communication to the connected device when the first determining step detects that the received control communication contains an undesirable control command.

7. A method of protecting an Internet of things (IOT) system having a human machine interface (HMI) and connected hardware equipment, including at least a security device having a communication interface, a memory, and a processor electrically connected to the memory, the processor configured to implement instructions stored in the memory to execute steps of the method, the method comprising:
an intercepting step of intercepting a communication between a controller and a connected device over an IOT network, the communication including a control communication for controlling the connected device;
a determining step of determining whether the received control communication contains an undesirable control command;
a passing step of passing the received control communication to the connected device when the first determining step does not determine that the received control communication contains an undesirable control command;
a blocking step of blocking the received control communication to the connected device when the first determining step detects that the received control communication contains an undesirable control command; and
an alarming step of sending an alarm to the HMI when the determining step determines that the received control communication contains an undesirable control command.

8. A method of protecting an Internet of things (IOT) system having connected hardware equipment, including at least a security device having a communication interface, a memory, and a processor electrically connected to the memory, the processor configured to implement instructions stored in the memory to execute steps of the method, the method comprising:
an intercepting step of intercepting a communication between a controller and a connected device over an IOT network, the communication including a control communication for controlling the connected device;
a first determining step of determining whether the received control communication contains an undesirable control command;
an obtaining step of obtaining configuration information from the connected device;
an analyzing step of analyzing the obtained configuration information;
a second determining step of determining whether the obtained configuration information contains an undesirable configuration based on a result of analysis in the analyzing step;
a passing step of passing the received control communication to the connected device when the first determining step does not determine that the received control communication contains an undesirable control command and the second determining step does not determine that the obtained configuration information contains an undesirable configuration; and
a blocking step of blocking the received control communication to the connected device when the first determining step detects that the received control communication contains an undesirable control command or the second determining step does not determine that the obtained configuration information contains an undesirable configuration.

9. The method according to claim 8, wherein the analyzing step compares the obtained configuration information with a reference source and the second determining step determines whether the obtained configuration information contains an undesirable configuration based on a result of the comparison made in the analyzing step.

10. The method according to claim 8, further comprising an updating step of updating the reference source when the second determining step determines that the obtained configuration information contains an undesirable configuration.

11. The method according to claim 8, further comprising a logging step of logging forensic data for the connected device when the second determining step determines that the obtained configuration information does not contain any undesirable configuration.

12. A method of protecting an Internet of things (IOT) system having connected hardware equipment, including at least a security device having a communication interface, a memory, and a processor electrically connected to the memory, the processor configured to implement instructions stored in the memory to execute steps of the method, the method comprising:
an intercepting step of intercepting a communication between a controller and a connected device over an IOT network, the communication including a control communication for controlling the connected device;
a determining step of determining whether the received control communication contains an undesirable control command;
a passing step of passing the received control communication to the connected device when the first determining step does not determine that the received control communication contains an undesirable control command; and
a blocking step of blocking the received control communication to the connected device and inserting a corrective communication into the connected device or into the communication to put the connected device or the communication into a different state when the determining step detects that the received control communication contains an undesirable control command.

13. A protection system for an Internet of things (IOT) system having connected hardware equipment, the protection system comprising:
an input/output (I/O) interface that communicates with a source that provides control communication; and
a security device that intercepts a communication between a connected device and the I/O interface over an IOT network,
wherein the security device includes a memory and a processor electrically connected to the memory and configured to implement instructions stored in the memory to execute:
a learning task that learns behavior patterns, the behavior patterns including normal behavior patterns of system processes operating in the IOT system and the connected hardware equipment in the IOT system and anomalous system behaviors and deviations in system state that indicate potential cyber incidents or general system failures, and differentiates therebetween;
a receiving task that receives an intercepted control communication from the I/O interface over the IOT network, the control communication including at least one control command to be sent to the connected device;

a determining task that determines whether the received control communication contains an undesirable control command;
a passing task that passes the received control communication to the connected device when the determining task does not determine that the received control communication contains an undesirable control command; and
a blocking task that blocks the received communication to the connected device when the determining task determines that the received control communication contains an undesirable control command.

14. A protection system for an Internet of things (IOT) system having a connected device, the protection system comprising:
an input/output (I/O) interface that communicates with a source that provides control communication; and
a security device that intercepts a communication between the connected device and the I/O interface over an IOT network,
wherein the security device includes a memory and a processor electrically connected to the memory and configured to implement instructions stored in the memory to execute:
a receiving task that receives an intercepted control communication from the I/O interface over the IOT network, the control communication including at least one control command to be sent to the connected device;
a maintenance task that provides integration of information from maintenance schedules, alarm conditions in the IOT system, and from lifecycle curves of connected hardware equipment operating within the IOT system to aid in anomaly detection where the failure occurs different from the expected lifecycle curve, wherein the information aids in addressing issues of false detections within incident detection algorithms used to evaluate the state in the IOT system;
a determining task that determines, based at least on the integrated information provided by the maintenance task, whether the received control communication contains an undesirable control command;
a passing task that passes the received control communication to the connected device when the determining task does not determine that the received control communication contains an undesirable control command; and
a blocking task that blocks the received communication to the connected device when the determining task determines that the received control communication contains an undesirable control command.

15. A protection system for an Internet of things (IOT) system having a connected device, the protection system comprising:
a human machine interface (HMI);
an input/output (I/O) interface that communicates with a source that provides control communication; and
a security device that intercepts a communication between the connected device and the I/O interface over an IOT network,
wherein the security device includes a memory and a processor electrically connected to the memory and configured to implement instructions stored in the memory to execute:
a receiving task that receives an intercepted control communication from the I/O interface over the IOT network, the control communication including at least one control command to be sent to the connected device;
a determining task that determines whether the received control communication contains an undesirable control command;
a passing task that passes the received control communication to the connected device when the determining task does not determine that the received control communication contains an undesirable control command;
a blocking task that blocks the received communication to the connected device when the determining task determines that the received control communication contains an undesirable control command; and
an alarming task of sending an alarm to the HMI when the determining task determines that the received control communication contains an undesirable control command.

16. A protection system for an Internet of things (IOT) system having a connected device, the protection system comprising:
an input/output (I/O) interface that communicates with a source that provides control communication; and
a security device that intercepts a communication between the connected device and the I/O interface over an IOT network,
wherein the security device includes a memory and a processor electrically connected to the memory and configured to implement instructions stored in the memory to execute:
a receiving task that receives an intercepted control communication from the I/O interface over the IOT network, the control communication including at least one control command to be sent to the connected device;
a first determining task that determines whether the received control communication contains an undesirable control command;
an obtaining task that obtains configuration information from the connected device;
an analyzing task that analyzes the obtained configuration information;
a second determining task that determines whether the obtained configuration information contains an undesirable configuration based on a result of analysis in the analyzing task;
a passing task that passes the received control communication to the connected device when the first determining task does not determine that the received control communication contains an undesirable control command and the second determining task does not determine that the obtained configuration information contains an undesirable configuration; and
a blocking task that blocks the received communication to the connected device when the first determining task determines that the received control communication contains an undesirable control command or the second determining task does not determine that the obtained configuration information contains an undesirable configuration.

17. A protection system for an Internet of things (IOT) system having a connected device, the protection system comprising:
an input/output (I/O) interface that communicates with a source that provides control communication; and a security device that intercepts a communication between the connected device and the I/O interface over an IOT network, wherein the security device includes a memory and a processor electrically connected to the memory and configured to implement instructions stored in the memory to execute:

a receiving task that receives an intercepted control communication from the I/O interface over the IOT network, the control communication including at least one control command to be sent to the connected device;

a determining task that determines whether the received control communication contains an undesirable control command;

a passing task that passes the received control communication to the connected device when the determining task does not determine that the received control communication contains an undesirable control command; and a blocking task that blocks the received communication to the connected device and inserts a corrective communication into the connected device or into the communication to put the connected device or the communication into a different state when the determining task determines that the received control communication contains an undesirable control command.

\* \* \* \* \*